(12) United States Patent
Satoyama et al.

(10) Patent No.: US 8,260,746 B2
(45) Date of Patent: *Sep. 4, 2012

(54) COMPUTER SYSTEM FOR HIERARCHICALLY MANAGING A JOURNAL AND METHOD THEREFOR

(75) Inventors: Ai Satoyama, Sagamirhara (JP); Yoshiaki Eguchi, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 3 days.

This patent is subject to a terminal disclaimer.

(21) Appl. No.: 13/209,075

(22) Filed: Aug. 12, 2011

(65) Prior Publication Data

US 2011/0314242 A1 Dec. 22, 2011

Related U.S. Application Data

(63) Continuation of application No. 12/355,100, filed on Jan. 16, 2009, now Pat. No. 8,037,027.

(30) Foreign Application Priority Data

Sep. 25, 2008 (JP) ................................. 2008-246053

(51) Int. Cl.
*G06F 17/30* (2006.01)
(52) U.S. Cl. ...................................... 707/640; 707/681
(58) Field of Classification Search ................... 707/640
See application file for complete search history.

(56) References Cited

U.S. PATENT DOCUMENTS

| 6,049,827 | A | * | 4/2000 | Sugauchi et al. | 709/223 |
| 6,269,382 | B1 | * | 7/2001 | Cabrera et al. | 1/1 |
| 7,441,080 | B2 | * | 10/2008 | Kano | 711/112 |
| 2005/0235016 | A1 | * | 10/2005 | Amano et al. | 707/204 |
| 2006/0149909 | A1 | | 7/2006 | Yamagami | |
| 2007/0038857 | A1 | * | 2/2007 | Gosnell | 713/165 |
| 2007/0067586 | A1 | | 3/2007 | Mikami | |
| 2007/0174669 | A1 | | 7/2007 | Ebata et al. | |
| 2008/0281879 | A1 | * | 11/2008 | Kawamura | 707/204 |

FOREIGN PATENT DOCUMENTS

| JP | 2005-018738 | 1/2005 |
| JP | 2007-080131 | 3/2007 |
| JP | 2007-133471 | 5/2007 |

* cited by examiner

*Primary Examiner* — Binh V Ho
(74) *Attorney, Agent, or Firm* — Antonelli, Terry, Stout & Kraus, LLP.

(57) ABSTRACT

A computer system having a first storage system which includes a first logical volume and a second logical volume, wherein the second logical volume stores a first differential data item representing a differential between data that was stored in the first logical volume at a first time instant and data that was stored in the first logical volume at a second time instant being later than the first time instant, and a second storage system which includes a third logical volume. The first storage system transmits the first differential data item to the second storage system, the second storage system stores the first differential data item into the third logical volume, the first storage system deletes the first differential data item from the second logical volume, and the computer system retains management information set for associating the first logical volume with the third logical volume storing therein the first differential data item.

7 Claims, 29 Drawing Sheets

OUTLINE OF PROCESSING OF MIGRATING P-VOL AND JNL DATA

DEVICE CONFIGURATION MANAGEMENT TABLE

| DEVICE # | STATUS | PATH AVAILABILITY | COUPLING HOST INFORMATION | CAPACITY | ATTRIBUTE |
|---|---|---|---|---|---|
| 401 | 402 | 403 | 404 | 405 | 406 |
| | | | | | |

LU MANAGEMENT TABLE

| LU # | PORT # | DEVICE # | LUN |
|---|---|---|---|
| 411 | 412 | 413 | 414 |
| | | | |

P-VOL (ONLINE VOLUME) CONFIGURATION MANAGEMENT TABLE

| DEVICE # | JNLG # | JNL INFORMATION TABLE STARTING ADDRESS |
|---|---|---|
| 421 | 422 | 423 |
| | | |

223

JNL INFORMATION TABLE  231

| P-VOL# | | STARTING ADDRESS | LENGTH | CREATION TIME |
|---|---|---|---|---|
| | | 431 | 432 | 433 | 434 |
| INTER-GENERATION DIFFERENTIAL DATA | GENERATION (i) | | | |
| | ~ | | | |
| | GENERATION (j) | | | |
| MERGED DIFFERENTIAL DATA | GENERATION (n) | | | |
| | ~ | | | |
| | GENERATION (m) | | | |

JNL CONTROL INFORMATION TABLE  232

| DEVICE # | 441 |
| LENGTH | 442 |
| DIFFERENTIAL BM | 443 |
| DATA STORING ADDRESS | 444A |
| ... | |
| DATA STORING ADDRESS | 444B |

JNL DATA PIECE  233

| JNL DATA ELEMENT | 451A |
| JNL DATA ELEMENT | 451B |
| ... | |

FIG. 4C

JNL MANAGEMENT TABLE

| P-VOL# (461) | SNAPSHOT ACQUISITION TIME (462) | BACKUP ACQUISITION TIME (463) |
|---|---|---|
|  |  |  |

P-VOL/JNL PAIR MANAGEMENT TABLE

| P-VOL# (471) | P-VOL STORING SYSTEM NUMBER (472) | COPY P-VOL# (473) | COPY P-VOL CREATION TIME (474) | JNL-VOL# (475) | COPY P-VOL/JNL PAIR NUMBER (476) |
|---|---|---|---|---|---|
|  |  |  |  |  |  |

CATALOG MANAGEMENT INFORMATION TABLE

| 501 P-VOL# | 502 P-VOL STORING SYSTEM NUMBER | 503 GENERATION NUMBER | 504 JOURNAL STORING EXTERNAL SYSTEM NUMBER | 505 EXTERNAL GENERATION NUMBER | 506 COPY P-VOL # | 507 EXTERNAL JNL-VOL # | 508 BACKUP ACQUISITION TIME |
|---|---|---|---|---|---|---|---|
|  |  |  |  |  |  |  |  |
|  |  |  |  |  |  |  |  |
|  |  |  |  |  |  |  |  |

FIRST TYPE OF DETACH

SECOND TYPE OF DETACH

COMPUTER SYSTEM FOR HIERARCHICALLY MANAGING A JOURNAL AND METHOD THEREFOR

CROSS-REFERENCE TO RELATED APPLICATIONS

This application is a continuation of U.S. application Ser. No. 12/355,100, filed Jan. 16, 2009, now U.S. Pat. No. 8,037,027 the entire contents of which are incorporated herein by reference.

CLAIM OF PRIORITY

The present application claims priority from Japanese application JP2008-246053 filed on Sep. 25, 2008, the content of which is hereby incorporated by reference into this application.

BACKGROUND

This invention relates to a technology for managing data stored in a storage system, in particular, a technology for managing a journal in a storage system having a snapshot function.

Known as functions included in a storage system are a snapshot function and a journal function.

The snapshot function is a function of retaining an image of a given logical volume at a given time point (for example, at a time point when a snapshot acquisition request is received from a host). Periodic execution of the snapshot function makes it possible to intermittently acquire a replication (in other words, backup) of data within the logical volume. In addition, the snapshot function enables restoration of the logical volume at a snapshot acquisition time point.

The journal function is a function of creating and saving a journal, which is data containing write data and control information regarding the writing, in a case where the write data is written into a logical volume specified by a write command issued from a host computer.

JP 2005-18738 A discloses a recovery processing executed at a point other than a point at which a snapshot is created, by having write data within a journal written into the snapshot acquired by the snapshot function.

JP 2007-80131 A discloses a technology related to switching between a snapshot and a journal.

JP 2007-133471 A discloses a technology related to operation of a volume for restoring a snapshot.

SUMMARY

As the number of generations of a backup saved by the snapshot function increases, a data amount to be stored also increases, and hence a disk space of a storage system becomes insufficient.

This invention has been made in view of the above-mentioned problem, and an object thereof is to hierarchically manage journal data by storing the journal data into another storage system coupled to one storage system, and to thereby increase an amount of backup data and the number of generations thereof that can be saved.

According to a representative invention disclosed in this application, there is provided a computer system, comprising: a first storage system coupled to a network; and a second storage system coupled to the first storage system, the first storage system comprising: a physical storage device for storing data; and a first controller for controlling writing and reading of data to/from the physical storage device, the first storage system managing a storage area of the physical storage device within the first storage system as a plurality of logical volumes, the plurality of logical volumes within the first storage system including a first logical volume and a second logical volume, the second logical volume storing therein journal data related to the first logical volume, the journal data related to the first logical volume including a first differential data item representing a differential between data that was stored in the first logical volume at a first time instant and data that was stored in the first logical volume at a second time instant being later than the first time instant, the second storage system comprising: a physical storage device for storing data; and a second controller coupled to the first storage system, for controlling writing and reading of data to/from the physical storage device, the second storage system managing a storage area of the physical storage device within the second storage system as a plurality of logical volumes, the plurality of logical volumes within the second storage system including a third logical volume, wherein: the first storage system transmits the journal data including the first differential data item to the second storage system; the second storage system stores the journal data received from the first storage system into the third logical volume; the first storage system deletes at least the first differential data item from the second logical volume; and the computer system retains a first management information set that includes information for associating the first logical volume with the third logical volume storing therein the journal data including the first differential data item related to the first logical volume.

According to an exemplary embodiment of this invention, it is possible to increase the amount of backup data and the number of generations thereof that can be saved.

BRIEF DESCRIPTION OF THE DRAWINGS

FIG. 4A is an explanatory diagram of a device configuration management table according to the first embodiment of this invention.

FIG. 4B is an explanatory diagram of an LU management table according to the first embodiment of this invention.

FIG. 4C is an explanatory diagram of a P-VOL configuration management table and tables related thereto according to the first embodiment of this invention.

FIG. 4D is an explanatory diagram of a JNL management table according to the first embodiment of this invention.

FIG. 4E is an explanatory diagram of a P-VOL/JNL pair management table according to the first embodiment of this invention.

FIG. 5 is an explanatory diagram of a format of a catalog management information table according to the first embodiment of this invention.

DETAILED DESCRIPTION OF THE PREFERRED EMBODIMENTS

Figure 1:
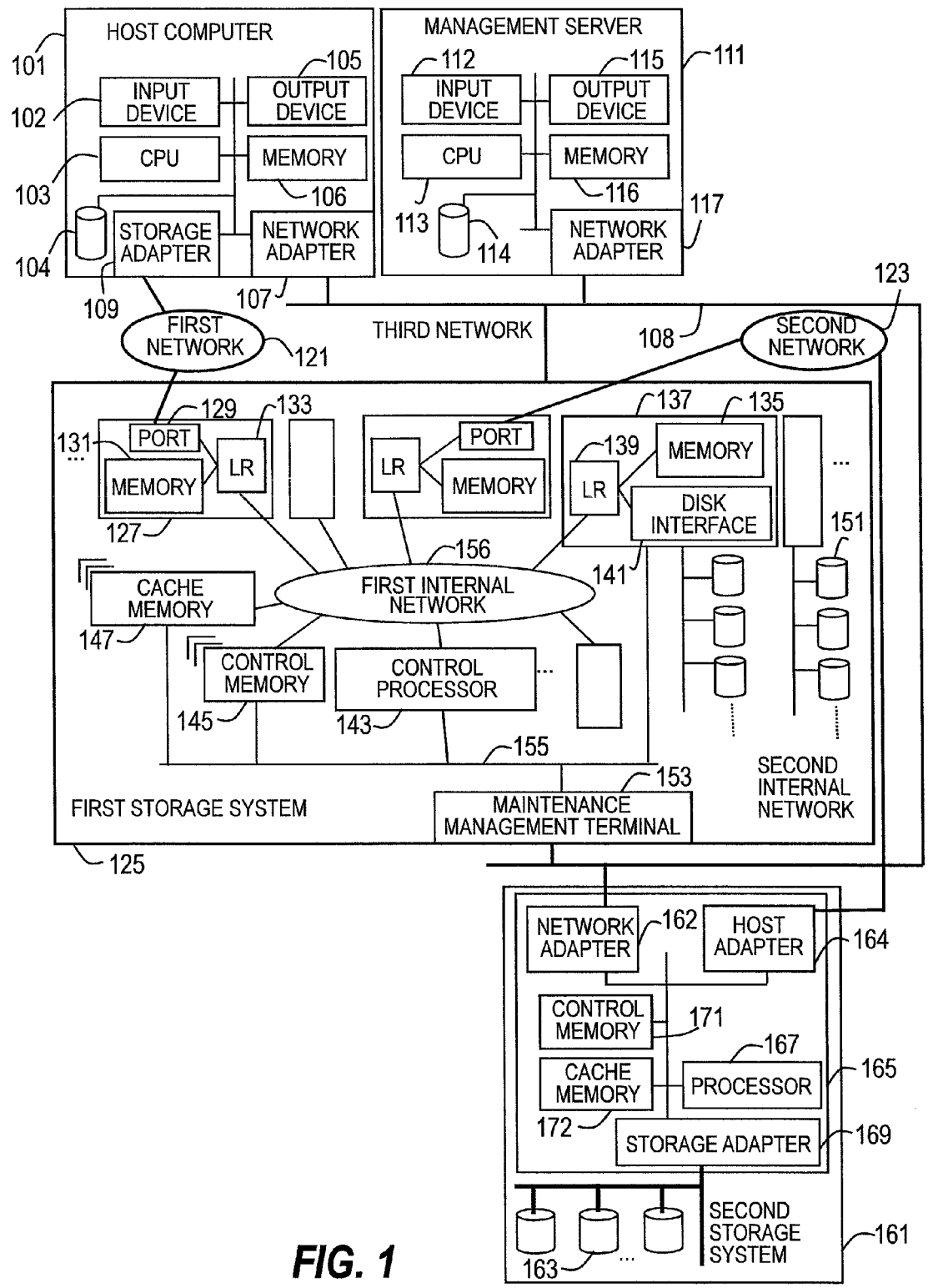
FIG. 1 is a block diagram illustrating a configuration of a computer system according to a first embodiment of this invention.

First, a first embodiment of this invention will be described in detail by referring to the drawings.

FIG. 1 is a block diagram illustrating a configuration of a computer system according to the first embodiment of this invention.

The computer system of this embodiment includes at least one host computer 101, a management server 111, a first storage system 125, and a second storage system 161. The first storage system 125 is coupled to the host computer 101 via a first network 121. The second storage system 161 is coupled to the first storage system 125 via a second network 123. The at least one host computer 101, the management server 111, the first storage system 125, and the second storage system 161 are coupled to one another via a third network 108.

The first network 121, the second network 123, and the third network 108 may be any kinds of network. For example, the first network 121 and the second network 123 may be a so-called storage area network (SAN). The third network 108 may be a so-called local area network (LAN).

The host computer 101 is a computer for accessing a logical volume provided by the first storage system 125. The host computer 101 includes a central processing unit (CPU) 103, a memory 106, an auxiliary storage device 104, an input device (for example, keyboard and pointing device) 102, an output device (for example, display device) 105, a storage adapter (for example, host bus adapter) 109 coupled to the first network 121, and a network adapter 107 coupled to the third network 108.

Figure 6:
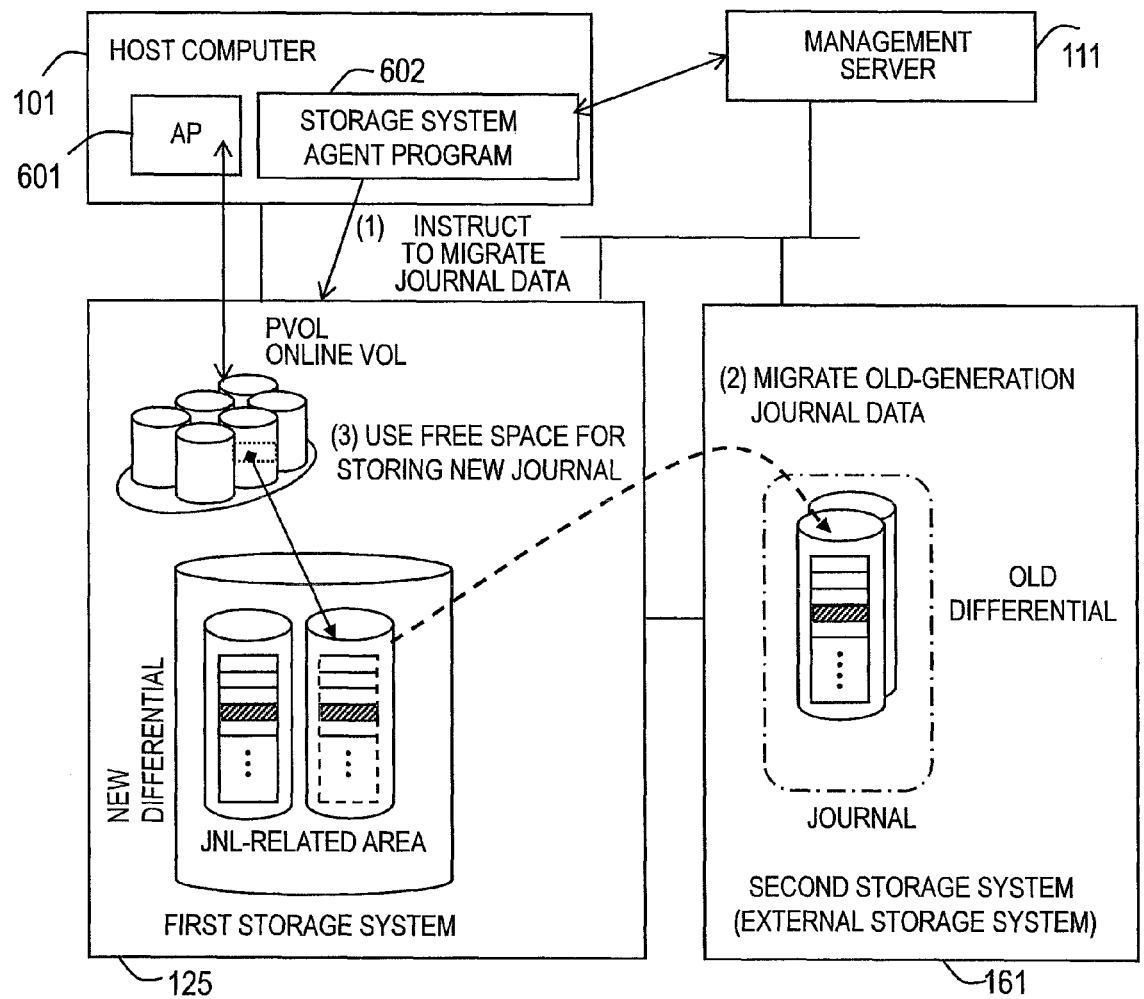
FIG. 6 is an explanatory diagram of an outline of a processing of migrating journal data to an external storage system, which is executed according to the first embodiment of this invention.

Stored in the memory 106 is a program executed by the CPU 103. As illustrated in FIG. 6, the memory 106 of this embodiment stores therein at least an application program (AP) 601 and a storage system agent program 602.

As necessary, the CPU 103 that executes the programs stored in the memory 106 transmits an I/O command (write command or read command) having an address specified via the storage adapter 109.

The management server 111 is a computer for managing the host computer 101 coupled to the third network 108, the first storage system 125, and the second storage system 161. The management server 111 includes a CPU 113, a memory 116, an auxiliary storage device 114, an input device (for example, keyboard and pointing device) 112, an output device (for example, display device) 115, and a network adapter 117 coupled to the third network 108.

Figure 3:
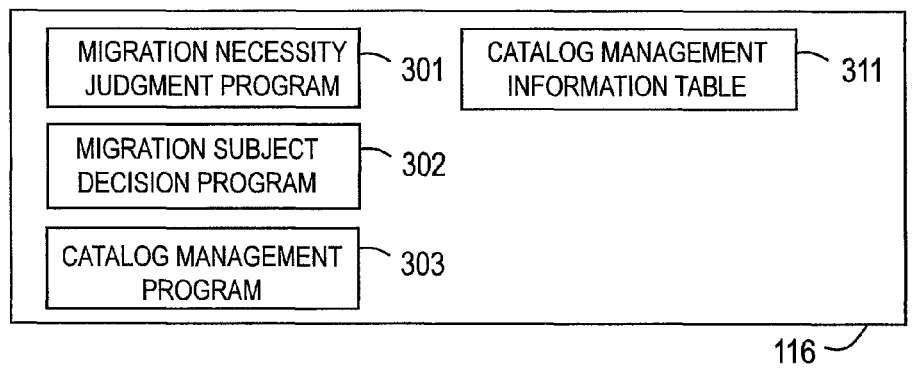
FIG. 3 is an explanatory diagram illustrating computer programs and information that are stored in a memory of a management server according to the first embodiment of this invention.

The CPU 113 transmits a command to the host computer 101, the first storage system 125, or the second storage system 161, which is coupled to the third network 108 via the network adapter 117. The memory 116 is a memory for storing computer programs and information that are illustrated in FIG. 3.

The first storage system 125 includes a controller and a storage device group. The controller includes, for example, a plurality of front end interfaces 127, a plurality of back end interfaces 137, a first internal network 156, at least one cache memory 147, at least one control memory 145, and at least one control processor 143.

The storage device group is constituted of a plurality of physical storage devices (hereinafter, referred to as "PDEV's") 151.

The front end interface 127 is an interface circuit for communicating with the host computer 101 or the second storage system 161 which is coupled to the first storage system 125 via the network. Therefore, the first storage system 125 includes at least two front end interfaces 127, one of which is coupled to the first network 121, and the other of which is coupled to the second network 123.

The front end interface 127 includes, for example, a port 129 coupled to the first network 121 or the second network 123, a memory 131, and a local router (hereinafter, referred to as "LR") 133. The LR 133 has the port 129 and the memory 131 coupled thereto.

The LR 133 routes data received via the port 129 in order to have the data processed by an arbitrary control processor 143. Specifically, for example, the control processor 143 sets the LR 133 so that the control processor 143 is caused to execute the I/O command having a given address specified. According to the setting, the LR 133 routes the I/O command and the data.

The back end interface 137 is an interface circuit for communicating with the PDEV 151. The back end interface 137 includes, for example, a disk interface 141 coupled to the PDEV 151, a memory 135, and an LR 139. The LR 139 has the disk interface 141 and the memory 135 coupled thereto.

The first internal network 156 is constituted of, for example, a switch (for example, crossbar switch) or a bus. Coupled to the first internal network 156 are the plurality of front end interfaces 127, the plurality of back end interfaces 137, the at least one cache memory 147, the at least one control memory 145, and the at least one control processor 143. Communications among those components are performed via the first internal network 156.

The cache memory 147 is a memory for temporarily storing data read or written according to the I/O command issued from the host computer 101.

The control memory 145 is a memory for storing various kinds of computer programs and information. Contents of the computer programs and information that are stored in the control memory 145 will be described later by referring to FIG. 2 and the like.

The control processor 143 is a processor for realizing control performed by the controller. Specifically, the control processor 143 executes the various kinds of computer programs stored in the control memory 145 to thereby execute processings described later.

The PDEV 151 is a nonvolatile storage device, for example, a hard disk drive (HDD) or a flash memory device. At least two PDEV's 151 may constitute a PDEV group conformed to RAID rules as a redundant array of independent disks (RAID) group.

A second internal network (for example, LAN) 155 is coupled to the components of the controller, in other words, the front end interface 127, the back end interface 137, the cache memory 147, the control memory 145, and the control processor 143. The second internal network 155 has a maintenance management terminal 153 coupled thereto. The maintenance management terminal 153 is also coupled to the third network 108, and is a computer for performing maintenance or management of the first storage system 125. A service engineer for the first storage system 125, for example, can operate the maintenance management terminal 153 (or management server 111 capable of communicating with the maintenance management terminal 153) to define various kinds of information stored in the control memory 145.

The second storage system 161 includes a controller 165 and a PDEV 163. The controller 165 includes, for example, a network adapter 162, a host adapter 164, a cache memory 172, a control memory 171, a processor 167, and a storage adapter 169.

The network adapter 162 is coupled to the third network 108, and is an interface for communicating with the management server 111.

The host adapter 164 is coupled to the second network 123, and is an interface for communicating with the first storage system 125. The host adapter 164 may be, for example, the same type as the front end interface 127 of the first storage system 125.

The control memory 171 is a memory for storing various kinds of computer programs and information.

The cache memory 172 is a memory for temporarily storing data read or written according to the I/O command issued from the first storage system 125.

The processor 167 executes the various kinds of computer programs stored in the control memory 171. The processor 167 at least controls writing to and reading from the cache memory 172 and the PDEV 163 according to the I/O command issued from the first storage system 125.

The PDEV 163 is a physical storage device, and may be, for example, the same type as the PDEV 151 of the first storage system 125. Alternatively, the PDEV 163 may be a tape storage medium.

The first storage system 125 of this embodiment includes a so-called external coupling function. This function allows the second storage system 161 to be externally coupled to the first storage system 125. Herein, description is made of the external coupling.

As has already been described, the first storage system 125 provides one or a plurality of logical volumes to the host computer 101. Each logical volume is recognized by the host computer 101 as one storage device. For example, the logical volume provided by the first storage system 125 may be associated with the PDEV 151 within the first storage system 125. In that case, upon reception of a write command with respect to a given logical volume, the first storage system 125 stores data into the PDEV 151 associated with the given logical volume. The given logical volume as described above will be referred to also as "normal volume" in the following description.

Alternatively, the logical volume provided by the first storage system 125 may be associated with the PDEV 163 within the second storage system 161. In this case, upon reception of a write command with respect to a given logical volume, the first storage system 125 generates a write command for writing data into the PDEV 163 associated with the given logical volume, and transmits the generated write command to the second storage system 161. According to the write command received from the first storage system 125, the second storage system 161 stores the data into the PDEV 163. The given logical volume as described above will be referred to also as "virtual volume" in the following description.

As described above, the function of storing the data, which is to be stored into the logical volume provided by the first storage system 125, actually into the second storage system 161 that is externally coupled to the first storage system 125 is called "external coupling function".

It should be noted that, in the following description, the storage system that is externally coupled by using such an external coupling function as described above will be referred to as "external storage system". In the first embodiment, the second storage system 161 serves as the external storage system.

Figure 2:
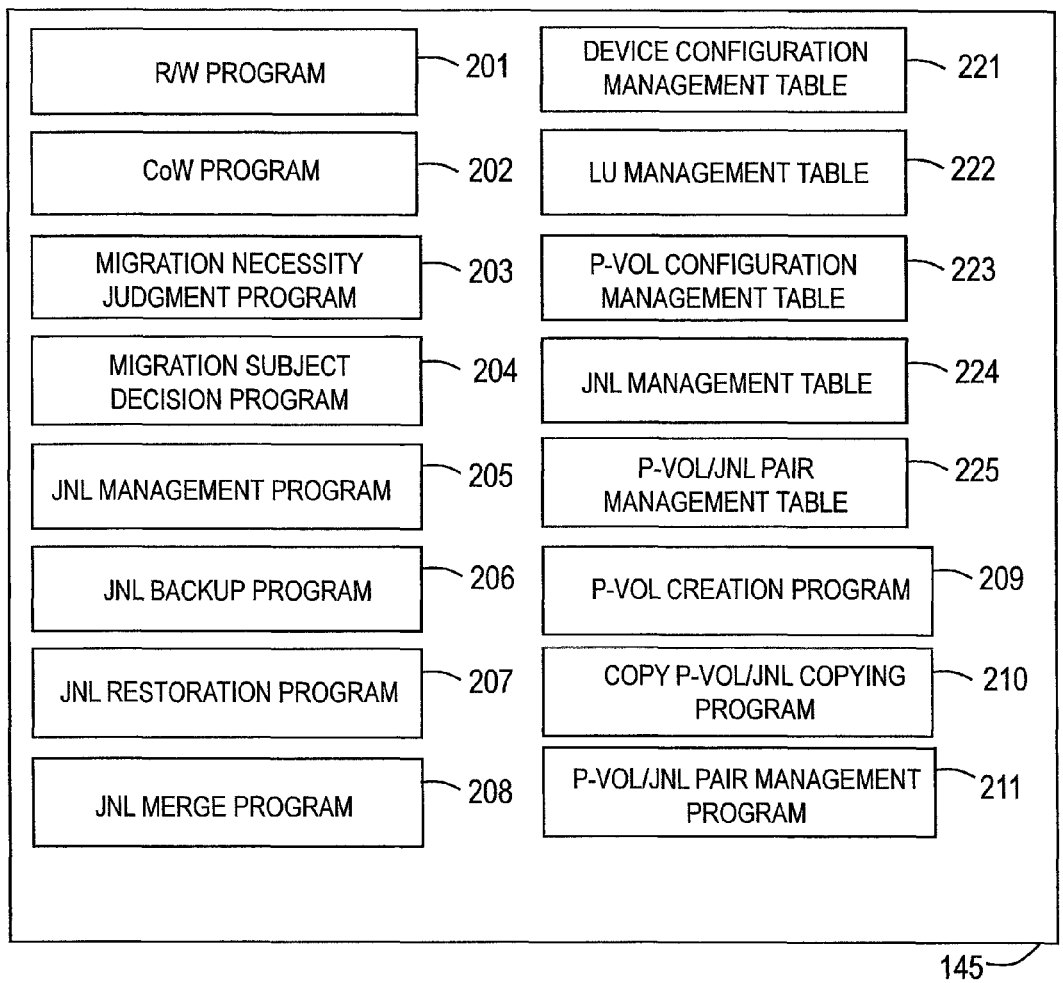
FIG. 2 is an explanatory diagram illustrating computer programs and information that are stored in a control memory of a first storage system 125 according to the first embodiment of this invention.

FIG. 2 is an explanatory diagram illustrating the computer programs and information that are stored in the control memory 145 of the first storage system 125 according to the first embodiment of this invention.

In the following description, a processing executed by a program is, in actuality, a processing executed by the control processor 143 that executes the program.

Stored in the control memory 145 are an R/W program 201, a Copy on Write (CoW) program 202, a migration necessity judgment program 203, a migration subject decision program 204, a journal (JNL) management program 205, a JNL backup program 206, a JNL restoration program 207, a JNL merge program 208, a primary volume (P-VOL) creation program 209, a copy P-VOL/JNL copying program 210, a P-VOL/JNL pair management program 211, a device configuration management table 221, an LU management table 222, a P-VOL configuration management table 223, a JNL management table 224, and a P-VOL/JNL pair management table 225.

The R/W program 201 controls an I/O according to the I/O command issued from the host computer 101. The JNL merge program 208 merges a plurality of generations of inter-generation differential data. The JNL backup program 206 creates an environment for backing up journal data into the second storage system 161. The JNL restoration program 207 restores the journal data backed up into the second storage system 161 as a volume in one of its generations that is specified within the first storage system 125. Details of the various programs and information that are stored in the control memory 145 will be described later.

FIG. 3 is an explanatory diagram illustrating the computer programs and information that are stored in the memory 116 of the management server 111 according to the first embodiment of this invention.

Stored in the memory 116 are a migration necessity judgment program 301, a migration subject decision program 302, a catalog management program 303, and a catalog management information table 311. Details of those programs and information will be described later.

Next, referring to FIGS. 4A through 4E, a format of journal (JNL) data according to this embodiment will be described.

In this embodiment, the journal data represents data created by a snapshot function of the first storage system 125 in order to save an image of a P-VOL at a desired time point. It should be noted that the P-VOL represents a logical volume specified as a subject of data I/O performed by the host computer 101. As described later, for example, by reflecting journal data on data stored in a current P-VOL, it is possible to restore data stored in a specified-generation P-VOL (in other words, P-VOL at a specified time in the past).

Specifically, FIGS. 4A through 4E illustrate examples of the device configuration management table 221, the LU management table 222, the P-VOL configuration management table 223, the JNL management table 224, and the P-VOL/JNL pair management table 225, which are illustrated in FIG. 2. It should be noted that FIG. 4C illustrates a JNL information table 231, a JNL control information table 232, and a JNL data piece 233, which are not illustrated in FIG. 2 since those are stored in the PDEV 151 instead of in the control memory 145.

FIG. 4A is an explanatory diagram of the device configuration management table 221 according to the first embodiment of this invention.

The device configuration management table 221 is a table prepared for each P-VOL. Recorded in the device configuration management table 221 for each P-VOL are a device #401, a status 402, a path availability 403, coupling host information 404, a capacity 405, and an attribute 406.

The device #401 is an identifier of each P-VOL.

The status 402 is information indicating a status of each P-VOL. The information indicating the status of each P-VOL represents, for example, information indicating an access limit (specifically, write/read inhibition, only read permission, or the like) set for each P-VOL.

The path availability 403 is information indicating whether or not an access path is defined between each P-VOL and the host computer 101.

The coupling host information 404 is information indicating the kind of host computer 101 that accesses each P-VOL, for example, information indicating the kind of operating system running on the host computer 101 and other such kind.

The capacity 405 is information indicating a capacity of each P-VOL.

The attribute 406 is information indicating which of a normal volume and a virtual volume each P-VOL is.

FIG. 4B is an explanatory diagram of the LU management table 222 according to the first embodiment of this invention.

The LU management table 222 is a table prepared for an LU necessary for an open host to perform an input/output. Recorded in the LU management table 222 for each LU are an LU #411, a port #412, a device #413, and an LUN 414.

The LU #411 is an identifier of each LU.

The port #412 is the number of the port 129 allocated to a target device corresponding to a P-VOL identified by the device #413.

The device #413 is an identifier of a P-VOL corresponding to each LU.

The LUN 414 is a logical unit number (LUN), representing an identifier for identifying each LU.

It should be noted that the LU #411 is unique to the port #412. In other words, a plurality of LU's that are allocated to the same port 129 are given mutually-different LU #'s 411, but if two LU's are allocated to mutually-different ports 129, those LU's may be given the same LU #'s 411. On the other hand, the LUN 414 is unique within the first storage system 125.

FIG. 4C is an explanatory diagram of the P-VOL configuration management table 223 and tables related thereto according to the first embodiment of this invention.

The P-VOL configuration management table 223 is a table prepared for a P-VOL for which the attribute 406 of the device configuration management table 221 is set to "normal volume". Recorded in the P-VOL configuration management table 223 are a device #421, a JNLG #422, and a JNL information table starting address 423.

The device #421 is an identifier of each P-VOL.

The JNLG #422 is the number of a journal group (JNLG) to which a journal corresponding to each P-VOL belongs. A plurality of journals (or volumes) belonging to the same journal group have generations of journal data thereof switched over at the same time.

The JNL information table starting address 423 represents a starting address of an area in which the JNL information table 231 related to the journal corresponding to each P-VOL is stored.

The JNL information table 231 is a table that is prepared for each P-VOL and used for managing inter-generation differential data (in other words, journal data) corresponding to the P-VOL. Recorded in the JNL information table 231 for each generation of the inter-generation differential data are a starting address 432, a length 433, and a creation time 434.

The starting address 432 represents a starting address of an area in which the JNL control information table 232 corresponding to each generation is stored.

The length 433 represents a data size of the inter-generation differential data corresponding to each generation and the number of elements thereof.

The creation time 434 represents a time at which a differential between generations is stored, for example, a time at which a marker causing a latest generation to be determined is received. The marker represents a command transmitted to the first storage system 125 by the host computer 101 in order to determine an image of the P-VOL as a generation of backup data. The first storage system 125, which has received the marker, uses the snapshot function to determine as the latest generation the image of the P-VOL specified by the marker at a marker reception time point.

In addition, the JNL information table 231 manages merged differential data created by merging a plurality of inter-generation differential data items. The starting address 432, the length 433, and the creation time 434 are also recorded in the JNL information table 231 for each generation of the merged differential data. It should be noted that the "generation" of a given merged differential data item represents a given generation (for example, latest or earliest generation) among a plurality of generations corresponding to the merged differential data item, and the creation time 434 represents a time at which the corresponding merged differential data item is stored in a JNL area.

By referencing the starting address 432 corresponding to a given generation of the inter-generation differential data or the merged differential data, it is possible to reference the JNL control information table 232 corresponding to the generation of the inter-generation differential data or the merged differential data.

The JNL control information table 232 exists for each generation of each of the inter-generation differential data items and the merged differential data items. The JNL control information table 232 is a table for managing a differential bitmap (BM) corresponding to a generation and a location of a data element.

Specifically, for example, recorded in the JNL control information table 232 are a device #441, a length 442, a differential BM 443, and a data storing address 444 corresponding to each of JNL data elements 451 that compose the corresponding JNL data piece 233.

The device #441 represents an identifier of a P-VOL corresponding to a journal indicated by the JNL control information table 232.

The length 442 represents a length of the journal data (in other words, inter-generation differential data or merged differential data) corresponding to each generation.

The differential BM 443 is a differential BM corresponding to each generation.

The data storing address 444 represents an address of an area in which each of the JNL data elements 451 that composes the JNL data piece 233 corresponding to each generation is stored. If the JNL data piece 233 corresponding to each generation includes a plurality of JNL data elements 451 (for example, JNL data element 451A and JNL data element 451B), the data storing address 444 includes a plurality of addresses (for example, data storing address 444A and data storing address 444B) corresponding to the plurality of JNL data elements 451.

FIG. 4D is an explanatory diagram of the JNL management table 224 according to the first embodiment of this invention.

The JNL management table 224 is a table prepared for each P-VOL and used for managing backup data regarding the P-VOL. Recorded in the JNL management table 224 are, for example, a P-VOL #461, a snapshot acquisition time 462, and the backup acquisition time 463.

The P-VOL #461 is a number (identifier) of a P-VOL. The same type of identifier as the device #401 may be used as the P-VOL #461.

The snapshot acquisition time 462 represents a time at which a secondary volume (S-VOL) that forms a pair with the P-VOL is created. For example, upon reception of a marker, the first storage system 125 may create an S-VOL corresponding to a generation of a snapshot created according to the marker, and store the JNL data piece 233 corresponding to the generation into the created S-VOL.

The backup acquisition time 463 represents a time at which a backup is acquired, in other words, a time at which the marker causing the generation of the snapshot indicated by the snapshot acquisition time 462 to be determined is received.

In addition, though not illustrated in FIG. 4D, the JNL management table 224 may have such information recorded therein as the number of acquired generations, a backup period, and the number of merged generations. The number of acquired generations represents the number of generations of backups acquired for the P-VOL. The number of merged generations represents a threshold value of the number of generations which indicates how many accumulated generations of inter-generation differential data trigger execution of a merge processing.

FIG. 4E is an explanatory diagram of the P-VOL/JNL pair management table 225 according to the first embodiment of this invention.

The P-VOL/JNL pair management table 225 includes information used for managing a pair of each P-VOL and a journal corresponding to the P-VOL. Specifically, recorded in the P-VOL/JNL pair management table 225 are a P-VOL #471, a P-VOL storing system number 472, a copy P-VOL #473, a copy P-VOL creation time 474, a JNL-VOL #475, and a copy P-VOL/JNL pair number 476.

The P-VOL #471 is a number (identifier) of a P-VOL. The same type of identifier as the device #401 may be used as the P-VOL #471.

The P-VOL storing system number 472 is a system identifier of a storage system that stores a P-VOL (in other words, that provides the P-VOL to the host computer 101).

The copy P-VOL #473 is an identifier of a copy of a P-VOL identified by the P-VOL #471. As described later, it is possible to create the copy of an arbitrary P-VOL and store the copy (hereinafter, referred to also as "copy P-VOL") into another storage system that is externally coupled to a storage system storing a source P-VOL. The copy P-VOL #473 is the identifier of the copy P-VOL thus copied and stored in the external storage system.

The copy P-VOL creation time 474 represents a time at which the copy P-VOL is created (or period during which the copy P-VOL is created).

The JNL-VOL #475 represents an identifier of a logical volume in which journal data corresponding to the copy P-VOL identified by the copy P-VOL #473 is stored.

The copy P-VOL/JNL pair number 476 is a number for identifying a pair of the copy P-VOL and the corresponding journal data.

FIG. 5 is an explanatory diagram of a format of the catalog management information table 311 according to the first embodiment of this invention.

The catalog management information table 311 is information indicating which system stores the journal data on each generation of each P-VOL. Specifically, recorded in the catalog management information table 311 are a P-VOL #501, a P-VOL storing system number 502, a generation number 503, a journal storing external system number 504, an external generation number 505, a copy P-VOL #506, an external JNL-VOL #507, and a backup acquisition time 508.

The P-VOL #501 is a number (identifier) of each P-VOL stored in a storage system under control of the management server 111. The same type of identifier as the device #401 may be used as the P-VOL #501.

The P-VOL storing system number 502 is a system identifier of a storage system that stores each P-VOL (in other words, that provides the P-VOL to the host computer 101).

The generation number 503 is a number of a generation of a snapshot created in correspondence with each P-VOL. In a case where snapshots of a plurality of generations corresponding to each P-VOL are created (in other words, the journal data items for restoring images of one P-VOL at a plurality of time points are recorded), a plurality of values (in other words, numbers assigned to a plurality of created generations) are recorded as the generation number 503 corresponding to one P-VOL #501.

The journal storing external system number 504 is a system identifier of a storage system that stores a copy of the journal data of the created generation. As described later, the copy of the journal data may be stored into a storage system that is externally coupled to the storage system storing the P-VOL (in other words, external storage system), and the original journal data may be deleted. In this case, the identifier of the storage system that stores the copy of the journal data is recorded as the journal storing external system number 504.

The external generation number 505 is a generation number that is assigned, in the case where the copy of the journal data is stored in the external storage system as described above, in order to allow the external storage system to manage the copy of the journal data.

The copy P-VOL #506 is an identifier of a copy of the P-VOL. In the case where the copy of the journal data is stored in the external storage system as described above, the copy of P-VOL may be further created and stored into the external storage system. The copy P-VOL #506 is the identifier of the copy thus created.

The external JNL-VOL #507 is an identifier of a logical volume within the external storage system in which the copy of the journal data is stored.

The backup acquisition time 508 represents a time at which the copy of the journal data is stored into the external storage system.

Herein, description is made of a specific example of the catalog management information table 311.

For example, the description is made of a case where the system identifier of the first storage system 125 is "ST1", the system identifier of the second storage system 161 is "ST2", and the identifier of the P-VOL stored in the first storage system 125 (hereinafter, in the description with reference to FIG. 5, referred to as "the subject P-VOL", which is a normal volume) is "P-VOL01". In this case, "P-VOL01" and "ST1" are recorded as the P-VOL #501 and the P-VOL storing system number 502 corresponding thereto, respectively.

In this example, if the snapshot of the subject P-VOL has been created twice in the past, the generation number "1" of the first (in other words, old) snapshot and the generation number "2" of the second (in other words, new) snapshot are recorded as the generation number 503 corresponding to "P-VOL01".

The journal data items of the snapshots of respective generations (at least JNL data pieces 233 of those generations) are normally stored in any one of logical volumes within the first storage system 125 (in other words, storage system that stores the subject P-VOL). However, a copy of at least one thereof may be stored in a logical volume within the second storage system 161. After the copy is stored into the logical volume within the second storage system 161, the copy source journal data item may be deleted from the first storage system 125.

For example, in a case where the journal data item of the generation of the second snapshot is deleted from the first storage system 125, and where the copy thereof is stored into a logical volume identified by the identifier "JNL-VOL11" of the second storage system 161, the values "ST2" and "JNL-VOL11" are recorded as the journal storing external system number 504 and the external JNL-VOL #507 corresponding to the value "2" of the generation number 503, respectively. Further, if the journal data item is managed as the first generation within the second storage system 161, the value "1" is recorded as the external generation number 505 corresponding to the value "2" of the generation number 503.

In this case, the time at which the copy of the journal data item of the second generation is stored into the second storage system 161 is recorded as the backup acquisition time 508 corresponding to the value "2" of the generation number 503.

In addition, the copy of the subject P-VOL may be created and stored into the second storage system 161. For example, in a case where the copy of the subject P-VOL is stored as a logical volume identified by the identifier "P-VOL11" of the second storage system 161, the value "P-VOL11" is recorded as the copy P-VOL #506 corresponding to "P-VOL01".

It should be noted that, in the example of FIG. 2, the catalog management information table 311 is stored only in the memory 116 of the management server 111, but information equivalent to the catalog management information table 311 may be stored in the memory 106 of the host computer 101, may be stored in the control memory 145 of the first storage system 125, or may be stored in the control memory 171 of the second storage system 161.

Herein, description is made of an outline of a processing of storing journal data.

Figure 19:
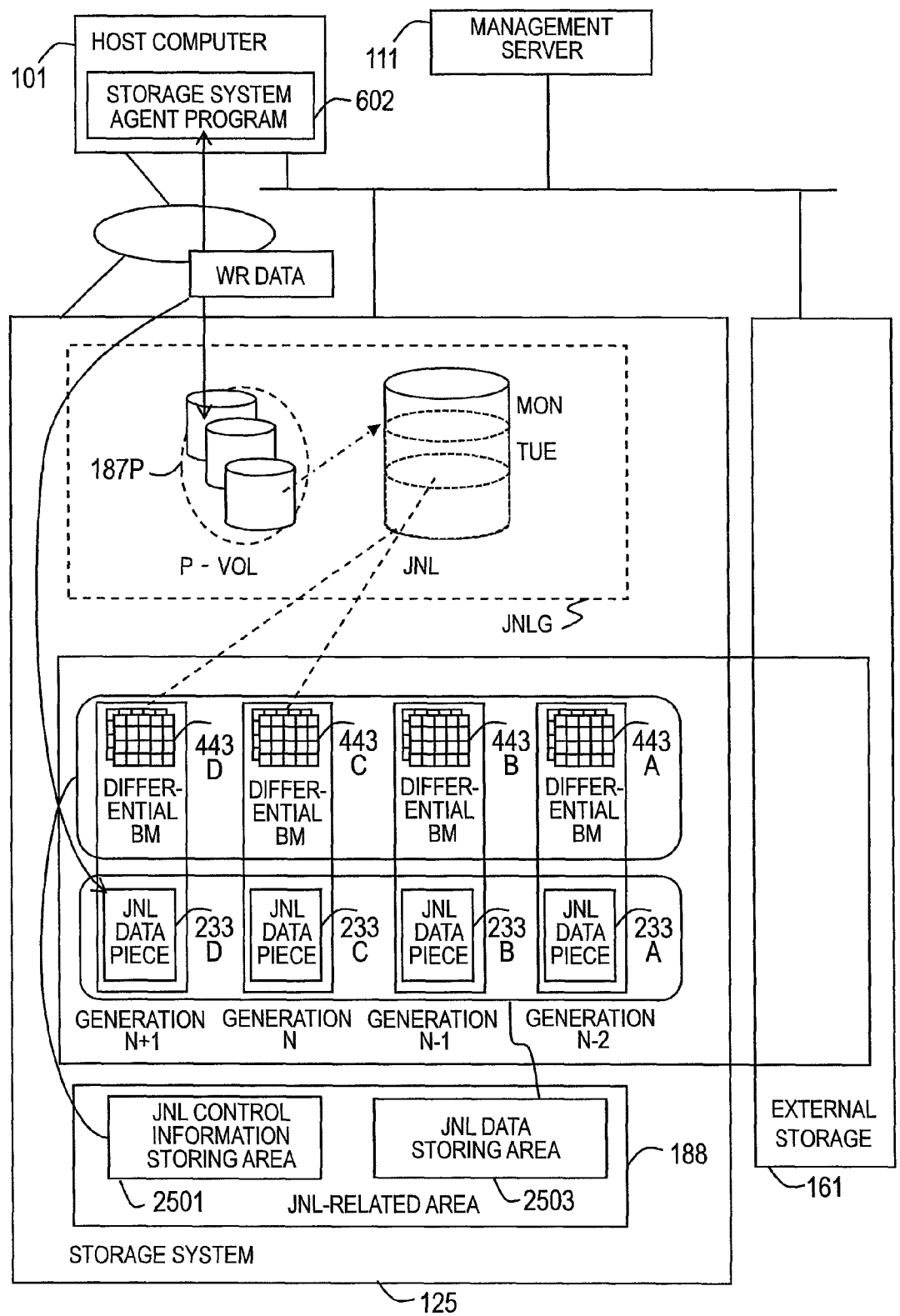
FIG. 19 is an explanatory diagram illustrating an outline of a processing of storing a JNL data element according to the first embodiment of this invention.

FIG. 19 is an explanatory diagram illustrating an outline of a processing of storing a JNL data element according to the first embodiment of this invention.

In the example of FIG. 19, a P-VOL 187P is stored in the first storage system 125. The P-VOL 187P is a primary logical volume (in other words, online logical volume). The P-VOL 187P is updated by having write data written thereinto from the host computer 101.

A JNL-related area 188 is a storage area that is secured in any one of the logical volumes within the first storage system 125, and includes a JNL control information storing area 2501 and a JNL data storing area 2503. As illustrated in FIG. 19, the JNL control information storing area 2501 stores therein the JNL control information table 232 including the differential BM 443 (where "BM" is the abbreviation of "bitmap") corresponding to each of determined generations. The JNL data storing area 2503 stores therein the JNL data piece 233 corresponding to each of the determined generations.

In the example of FIG. 19, a differential BM 443A and a JNL data piece 233A corresponding to the generation (N−2), a differential BM 443B and a JNL data piece 233B corresponding to the generation (N−1), a differential BM 443C and a JNL data piece 233C corresponding to the generation (N), and a differential BM 443D and a JNL data piece 233D corresponding to the generation (N+1) are stored. In the description with reference to FIG. 19, the differential BM's 443A through 443D will also be referred to generically as the differential BM 443 for common description thereof. The JNL data pieces 233A through 233D will also be referred to generically as the JNL data piece 233 for common description thereof.

It should be noted that FIG. 19 illustrates the differential BM 443 and the JNL data piece 233 as representative components of the journal data, but in actuality, as illustrated in FIG. 4C, various kinds of necessary information are stored.

Herein, the "generation" represents a given time point regarding the P-VOL 187P. For example, the generation (N) represents a time when a predetermined generation determining event regarding the P-VOL 187P occurs after the time point of the generation (N−1) is passed (in this embodiment, when a marker described later is received from the host computer 101).

It should be noted that, in the example of FIG. 19, the determined latest generation is the generation (N), and hence an undetermined generation is the generation (N+1). When the next marker is received, the generation (N+1) is determined. Therefore, the generation (N+1) becomes the determined latest generation, and the undetermined generation becomes the generation (N+2).

In the case where the generation is updated as described above, an entry regarding the newly determined generation is added to the JNL information table 231.

As described with reference to FIG. 4C, the JNL data piece 233 is a set of at least one JNL data element 451. The JNL data element 451 is a data element that is saved from the P-VOL 187P, which is triggered when the data element is written into the P-VOL 187P.

Specifically, for example, in a case where the undetermined generation is the generation (N), when the first storage system 125 receives a marker from the host computer 101, the generation (N) is determined, and the undetermined generation becomes the generation (N+1). In that case, the JNL data piece 233B having data elements accumulated in the JNL data storing area 2503 (in other words, data corresponding to a differential between the P-VOL 187P of the generation (N) and the P-VOL 187P of the generation (N−1)) is saved into the JNL data storing area 2503 as the JNL data elements 451 used for restoring the P-VOL of the previous generation (in this example, generation (N−1)).

Thus accumulated in the JNL data storing area 2503 are data elements of the JNL data piece 233 corresponding to the generation (N) (in other words, data corresponding to a differential between the generation (N) and the generation (N−1)).

The differential BM 443 is a bitmap indicating a differential between generations of a logical volume. Specifically, for example, in the example of FIG. 19, the differential BM 443 corresponding to the generation (N) is a bitmap indicating the differential between the P-VOL 187P of the generation (N) and the P-VOL 187P of the generation (N−1).

More specifically, in a case where a write data element is first written into a given block within the P-VOL 187P at a given time point after the generation (N−1), a bit corresponding to the given block (bit within the differential BM 443 corresponding to the generation (N)) is turned on (in other words, updated to a value indicating an occurrence of write (for example, "1")), and the JNL data element 451 corresponding to the write data element is stored into the JNL data storing area 2503. It should be noted that each of bits composing the differential BM 443 corresponds to each block of the P-VOL 187P.

In the example of FIG. 19, the differential BM 443 corresponding to a write data element written on Monday and the JNL data piece 233 corresponding thereto are handled as "Monday journal data", and the differential BM 443 corresponding to a write data element written on Tuesday and the JNL data piece 233 corresponding thereto are handled as "Tuesday journal data".

Next, description will be made of a method of acquiring JNL data.

There exist two methods of acquiring JNL data. According to a method illustrated in FIG. 20, a write data element is stored into the P-VOL, and data of the P-VOL before being updated by the storing is stored as the JNL data piece 233. The journal data created as described above is also called a Before journal. On the other hand, according to a method illustrated in FIG. 22, a write data element is stored into the P-VOL, and updated data is stored as the JNL data piece 233 upon reception of a marker. The journal data created as described above is also called an After journal.

Figure 20:
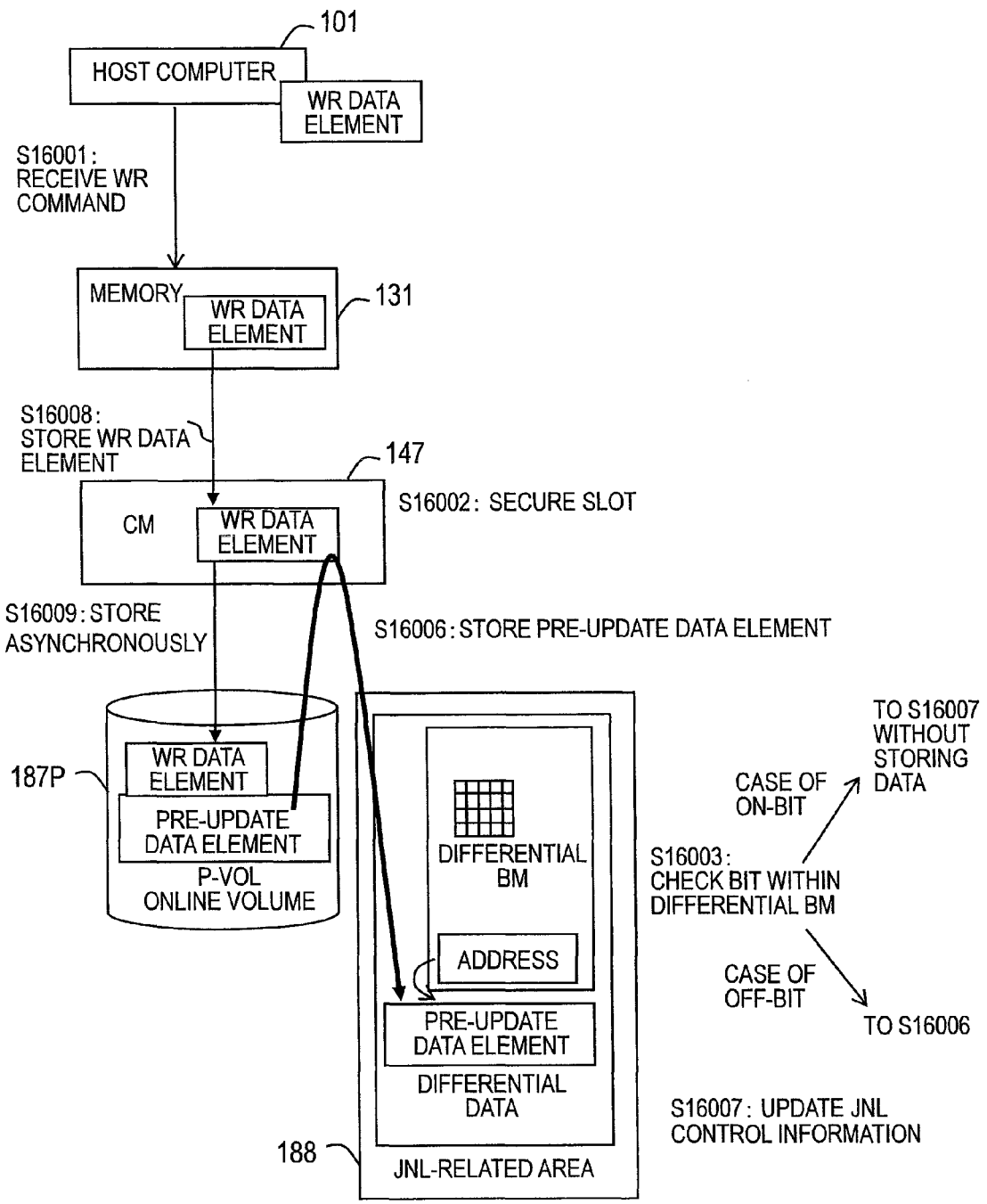
FIG. 20 is an explanatory diagram of a write processing for writing a write data element into a P-VOL in the case of creating a Before journal according to the first embodiment of this invention.

FIG. 20 is an explanatory diagram of a write processing for writing a write data element into a P-VOL in the case of creating the Before journal according to the first embodiment of this invention.

In the description with reference to FIG. 20, the P-VOL specified by a write command as a write destination is referred to as a "target P-VOL".

When receiving a write command (for example, with the P-VOL 187P specified as the write destination) from the host computer 101 (S16001), the R/W program 201 secures a slot for storing a write data element (S16002). The "slot" represents a unit management area of the cache memory 147.

Further, the R/W program 201 references a bit corresponding to a write destination block within the differential BM 443, which is specified by the write command (S16003).

If a reference destination is an on-bit as a result of Step S16003, data stored in the write destination block specified by the write command has been updated at least once since the previous time of receiving a marker until the present time. In this case, the R/W program 201 executes a processing of a Step S16008 and the subsequent steps. In other words, the procedure advances to Step S16007 without saving a data element stored in the write destination block.

On the other hand, if the reference destination is an off-bit as a result of Step S16003, the data stored in the write destination block specified by the write command has never been updated since the previous time of receiving the marker until the present time. In other words, the data stored in the write destination block specified by the write command is data that was stored in the same block at the previous time of receiving the marker. The data needs to be saved in order to restore the target P-VOL 187P at the previous time of receiving the marker. Therefore, the R/W program 201 stores (in other words, saves) the data element stored in the write destination block into the JNL data storing area 2503 as the JNL data element 451 (S16006).

Then, the R/W program 201 updates the JNL control information table 232 so as to reflect the storing of Step S16006 thereon (S16007). Specifically, the R/W program 201 turns on the bit of the differential BM 443 corresponding to the write destination block, and adds the address of the area in which the JNL data element 451 is stored in Step S16006 as the data storing address corresponding to the write destination block.

After that, the R/W program 201 writes the write data element stored in the memory 131 within the front end interface 127 into the slot secured in Step S16002 (S16008).

The R/W program 201 writes the write data element written in the slot into the write destination block within the P-VOL (S16009).

Figure 21:
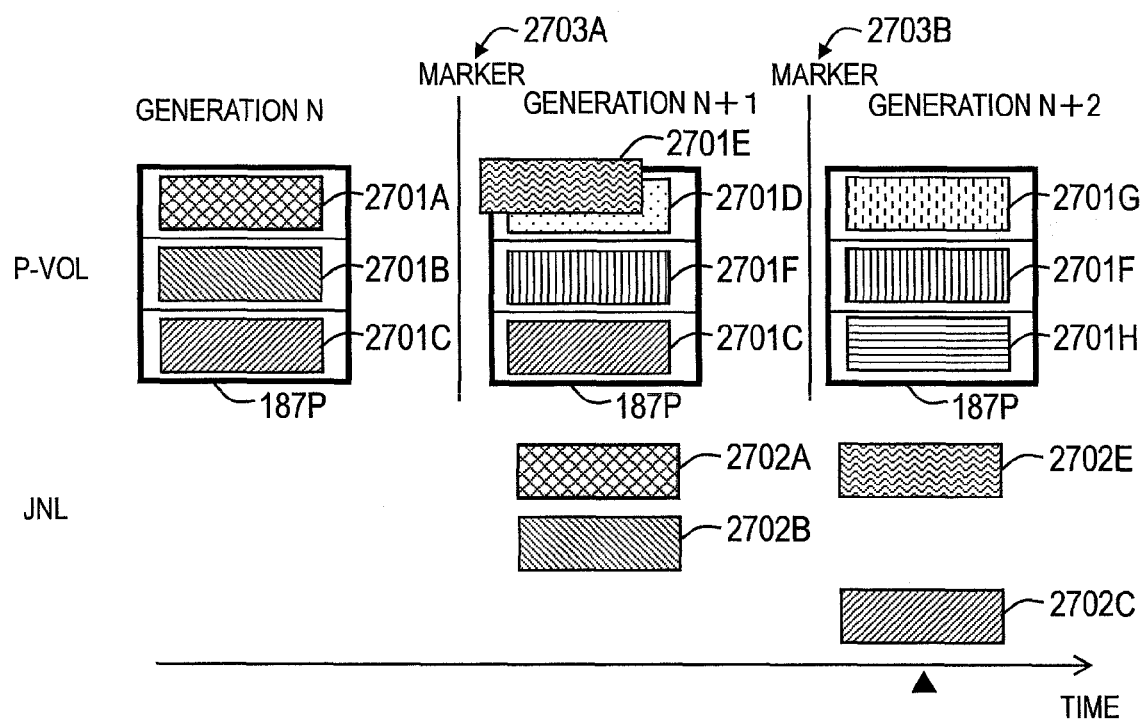
FIG. 21 is an explanatory diagram of an example of the created journal data in the case of creating the Before journal according to the first embodiment of this invention.

FIG. 21 is an explanatory diagram of an example of the created journal data in the case of creating the Before journal according to the first embodiment of this invention.

Specifically, FIG. 21 exemplifies a transition of data stored in the P-VOL 187P.

At the oldest time point in the illustration of FIG. 21, the P-VOL 187P stores therein data elements 2701A, 2701B, and 2701C (generation N). For the brief description, it is assumed that the data elements 2701A, 2701B, and 2701C are respectively stored in three blocks of the P-VOL 187P.

After that, the first storage system 125 receives a marker 2703A from the host computer 101. At this time point, the generation N is determined.

After that, according to the write command issued from the host computer 101, the data element 2701A is updated to a data element 2701D. In this case, the first storage system 125 stores the copy of the data element 2701A into the JNL data storing area 2503 as a JNL data element 2702A. It should be noted that the JNL data element 2702A corresponds to any one of the JNL data elements 451 (such as JNL data elements 451A and 451B) illustrated in FIG. 4C. The same holds true of a JNL data element 2702B or the like described later.

In the same manner, when the data element 2701B is updated to a data element 2701F, the copy of the data element 2701B is stored as the JNL data element 2702B into the JNL data storing area 2503.

In addition, though not illustrated in FIG. 21, the bits of the differential BM 443, which respectively correspond to the block in which the data element 2701A was stored and the block in which the data element 2701B was stored, are updated to "ON".

After that, the data element 2701D is further updated to a data element 2701E. However, in this case, the copy of the data element 2701A (in other words, data stored at the time of receiving the marker 2703A) has already been stored as the JNL data element 2702A, and hence the copy of the data element 2701D is not stored.

After that, the first storage system 125 receives a marker 2703B from the host computer 101. At this time point, the generation N+1 is determined. The differential BM 443 and the JNL data elements 2702A and 2702B that are stored at this time point are necessary to restore the P-VOL 187P of the generation N, and are therefore retained without a change until the generation N is discarded or merged.

After that, the data element 2701E is updated to a data element 2701G, and the data element 2701C is updated to a data element 2701H. In this case, the copy of the data element 2701E and the copy of the data element 2701C are stored as a JNL data element 2702E and a JNL data element 2702C, respectively, into an area newly prepared within the JNL data storing area 2503.

Further, the differential BM 443 is newly prepared, and the bits thereof, which respectively correspond to the block in which the data element 2701E was stored and the block in which the data element 2701C was stored, are updated to "ON".

As a result of the above-mentioned update, it is assumed that the P-VOL 187P at the present time stores therein the data elements 2701G, 2701-F, and 2701H. The P-VOL 187P at the present time corresponds to the generation N+2, but is not determined until the next marker (not shown) is received.

By replacing the data elements 2701G and 2701H of the P-VOL 187P at the present time by the JNL data elements 2702E and 2702C, respectively, it is possible to restore the P-VOL 187P of the determined generation N+1. By further replacing the JNL data elements 2702E and 2701F of the restored P-VOL 187P of the generation N+1 by the JNL data elements 2702A and 2702B, respectively, it is possible to restore the P-VOL 187P of the generation N.

The replacement may be physically executed by overwriting the data, but may be virtually executed by changing access destinations.

To describe an example case where the data element 2701G of the P-VOL 187P is replaced by the JNL data element 2702E as described above, the JNL data element 2702E may be overwritten onto the data element 2701G of the P-VOL 187P. Alternatively, when receiving a read request with respect to the block in which the data element 2701G is stored, instead of reading the data element 2701G from the requested block, the R/W program 201 may read the JNL data element 2702E from the storage area in which the JNL data element 2702E is stored, and transmit the JNL data element 2702E as a response to the read request.

It should be noted that, in the description of this embodiment, the "reflection" as in "reflecting the journal data on the P-VOL" means the replacement as described above.

Figure 22:
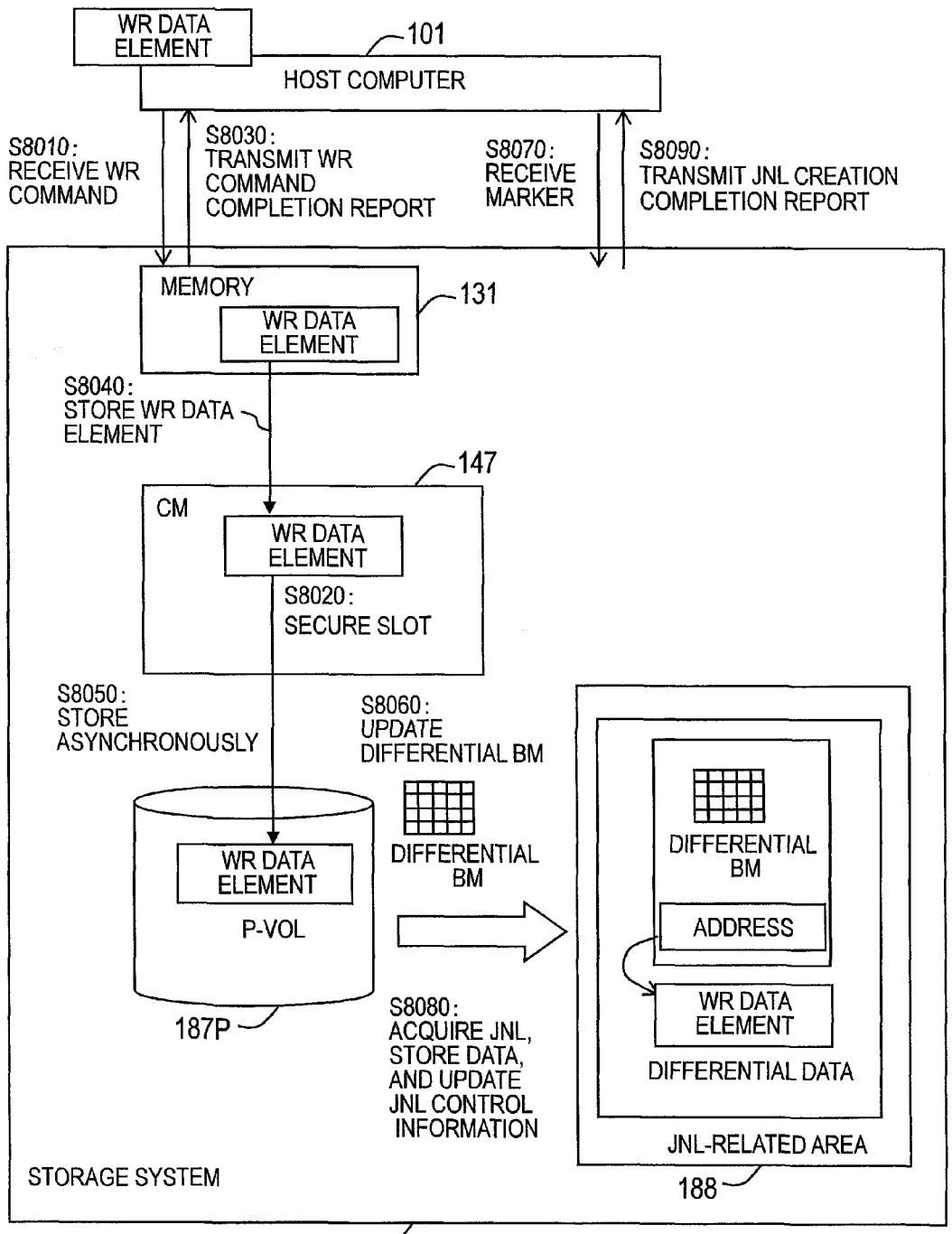
FIG. 22 is an explanatory diagram of a write processing for writing a write data element into a P-VOL in the case of creating an After journal according to the first embodiment of this invention.

FIG. 22 is an explanatory diagram of a write processing for writing a write data element into a P-VOL in the case of creating the After journal according to the first embodiment of this invention.

In the description with reference to FIG. 22, the P-VOL specified by a write command is referred to as a "target P-VOL". In addition, in the following description, to avoid redundancy in description, an object corresponding to the generation K will be sometimes referred to by adding the suffix (K) to the name of the object. Specifically, for example, the JNL control information corresponding to the generation (j) will be sometimes referred to as "JNL control information (j)".

The front end interface 127 receives a write command and a write data element from the host computer 101, and stores the write data element into the memory 131 (S8010). The write command is transferred to the control processor 143.

In response to the reception of the write command, the R/W program 201 secures a slot in the cache memory 147 (S8020).

The R/W program 201 transmits a report indicating a completion of the write command to the host computer 101 that has transmitted the write command (S8030). In response thereto, the write data element is transmitted from the host computer 101, and stored into the memory 131 within the front end interface 127.

The R/W program 201 writes the write data element stored in the memory 131 within the front end interface 127 into the secured slot (S8040).

The R/W program 201 writes the write data element written in the slot into the write destination block within the target P-VOL 187P (S8050). In addition, the R/W program 201 turns "ON" the bit corresponding to the updated block among bits of the differential BM 443 of the P-VOL 187P (S8060).

After that, at an arbitrary timing, the host computer 101 transmits a marker to the P-VOL 187P. When receiving the marker (S8070), the first storage system 125 acquires journal data (S8080). In other words, the first storage system 125 copies the data, which is stored in the block corresponding to the "ON"-bit among bits of the differential BM 443 corresponding to the target P-VOL 187P, as the JNL data piece 233 within the JNL data storing area 2503. The first storage system 125 manages the address of the copy destination area as the data storing address 444.

When the creation of the journal data is completed by the above-mentioned processing, the first storage system 125 transmits a completion report to the host computer 101 (S8090).

Hereinafter, unless otherwise specified, description will be made by employing the case of creating the Before journal as an example, but this invention can be applied also to the case of creating the After journal by the same processing.

Next, description will be made of a processing of migrating the journal data to the external storage system. The migration of the journal data to the external storage system means to store the copy of the journal data (at least JNL control information table 232 and JNL data piece 233) stored in the first storage system 125 into the second storage system 161, and delete the source journal data from the first storage system 125.

FIG. 6 is an explanatory diagram of an outline of a processing of migrating the journal data to the external storage system, which is executed according to the first embodiment of this invention.

In the example of FIG. 6, if a predetermined condition is satisfied, the management server 111 transmits a journal data migration instruction to the storage system agent program 602 of the host computer 101.

The host computer 101 transmits the journal data migration instruction to the first storage system 125.

The first storage system 125 transmits the copy of the journal data specified by the received instruction (for example, journal data of the oldest generation) to the second storage system 161.

The second storage system 161 stores the received copy of the journal data into a logical volume.

When the copy of the journal data is stored into the second storage system 161, the first storage system 125 deletes the specified journal data from the JNL-related area 188 of the first storage system 125. A free space created by the deletion can be used for storing the journal data of the new generation.

Figure 7:
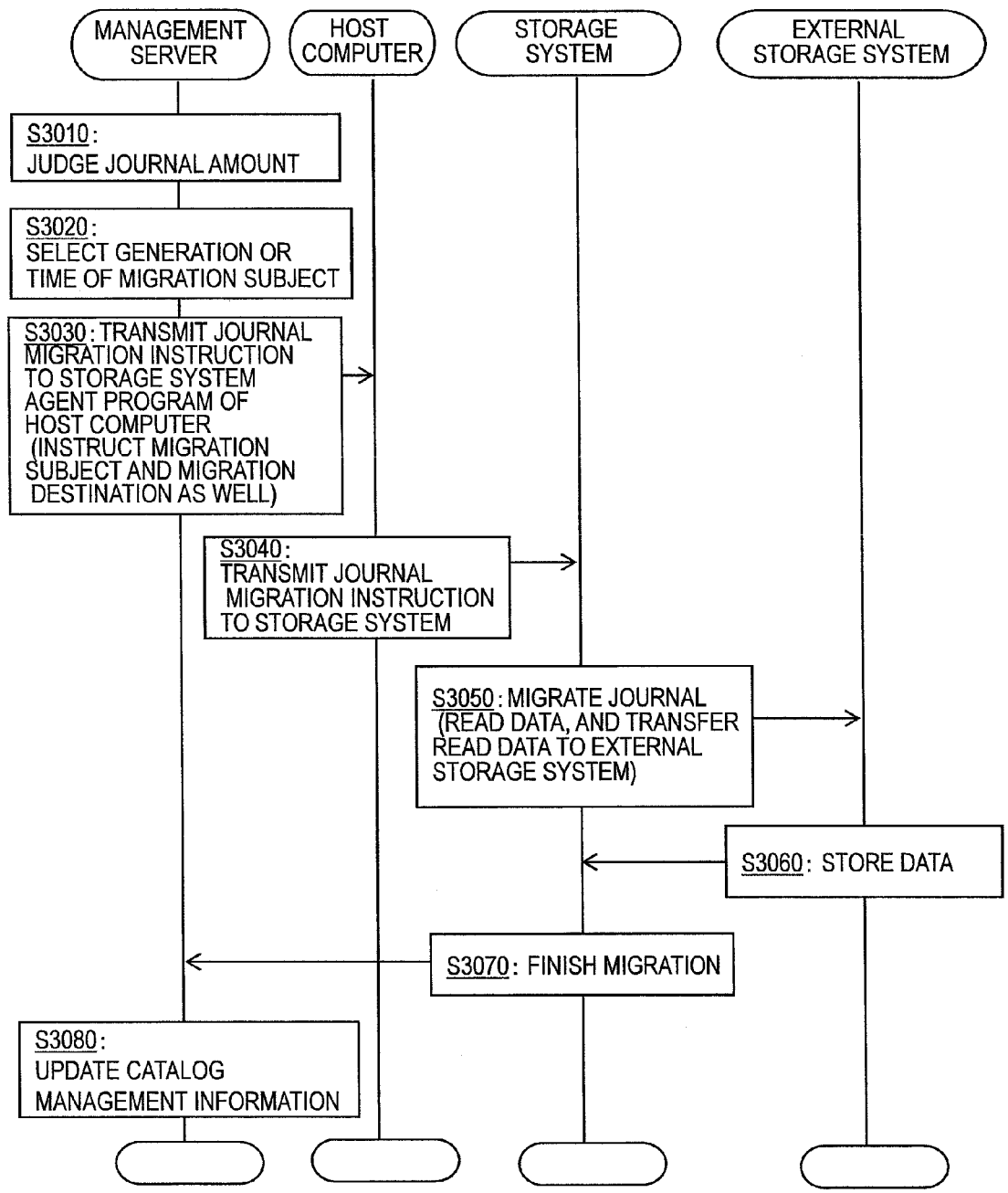
FIG. 7 is a flowchart illustrating the processing of migrating the journal data to the external storage system, which is executed according to the first embodiment of this invention.

FIG. 7 is a flowchart illustrating the processing of migrating the journal data to the external storage system, which is executed according to the first embodiment of this invention.

FIG. 7 illustrates details of the processing illustrated in FIG. 6.

First, the migration necessity judgment program 301 of the management server 111 judges whether or not the journal data needs to be migrated to the external storage system (S3010). Specifically, the migration necessity judgment program 301 may judge whether or not a predetermined condition is satisfied, and if it is judged that the predetermined condition is satisfied, judge that the journal data needs to be migrated to the external storage system.

For example, the migration necessity judgment program 301 monitors a journal data amount stored in the first storage system 125, and if the journal data amount exceeds a predetermined threshold value, may judge that the predetermined condition is satisfied.

The journal data amount stored in the first storage system 125 is calculated by, for example, summing up values of the length 442 recorded in the JNL control information tables 232 of all generations. The migration necessity judgment program 301 can monitor the journal data amount by acquiring the values of the length 442 or a total sum value thereof from the first storage system 125.

If the journal data amount acquired as described above exceeds the predetermined threshold value, the migration necessity judgment program 301 may judge that the predetermined condition is satisfied (in other words, the journal data needs to be migrated to the external storage system).

Alternatively, if the whole data amount stored in the first storage system 125 exceeds the predetermined threshold value, the migration necessity judgment program 301 may judge that the predetermined condition is satisfied.

Alternatively, the migration necessity judgment program 301 may monitor an access frequency with respect to the journal data stored in the first storage system 125, and if the access frequency with respect to the journal data becomes lower than a predetermined threshold value, judge that the predetermined condition is satisfied (in other words, the journal data needs to be migrated to the external storage system). It should be noted that the access frequency may be calculated by, for example, such a method as described later in association with Step S3020.

Alternatively, the migration necessity judgment program 301 may judge that the predetermined condition is satisfied if the instruction to migrate the journal data is received from a user.

If it is judged in Step S3010 that the predetermined condition is satisfied, the migration subject decision program 302 of the management server 111 selects the journal data to be migrated (S3020). Specifically, the migration subject decision program 302 selects the generation or the creation time of the JNL data piece 233 to be migrated.

The migration subject decision program 302 can migrate the journal data of an arbitrary generation to the external storage system. However, in order to restore the P-VOL of a desired generation by using the journal data that has been migrated to the external storage system, a time is required to copy the journal data from the external storage system to the first storage system 125. In order to reduce such a time for the copy, it is desirable to migrate the journal data having a low access frequency (in other words, journal data regarding the generation that is restored less frequently) to the external storage system.

In general, it is expected to be less likely that an old generation needs to be restored. Therefore, the journal data of the oldest generation may be selected in Step S3020.

Alternatively, the migration subject decision program 302 may acquire the access frequency of each generation, and select the journal data of the generation having the lowest access frequency. In this case, the first storage system 125 needs to provide the management server 111 with information indicating the access frequency of each generation. For example, an access count for each generation (in other words, number of times that the generation has been restored) may be further recorded in the JNL information table 231, and the access frequency may be calculated based on the access count (not shown) and the creation time 434.

Alternatively, the migration subject decision program 302 may select in Step S3020 the journal data specified by a user. The user may use the input device 112 of the management server 111 to input, for example, information for specifying an arbitrary generation. In this case, the migration subject decision program 302 selects the journal data of the generation specified by the user.

In addition, the migration subject decision program 302 also selects in Step S3020 a migration destination for the selected journal data. Specifically, for example, the migration subject decision program 302 may select as the migration destination a logical volume having a free space equal to or larger than the amount of the selected journal data among the logical volumes within the second storage system 161.

Subsequently, the management server 111 transmits the journal data migration instruction to the host computer 101 (S3030). The journal data migration instruction includes specification of the journal data to be migrated and the migration destination (in other words, journal data and migration destination selected in Step S3020).

The host computer 101 transmits the journal data migration instruction received from the management server 111 to the first storage system 125 (S3040).

According to the received journal data migration instruction, the JNL backup program 206 of the first storage system 125 migrates the specified journal data to the specified migration destination (S3050). Specifically, for example, if the generation of the journal data to be migrated is specified, the JNL backup program 206 reads the journal data (at least differential BM 443 and JNL data piece 233) corresponding to the specified generation from the JNL-related area 188, and transmits an instruction to store the read journal data into the specified migration destination to the second storage system 161.

According to the transmitted instruction, the second storage system 161 (in other words, external storage system) stores the transmitted journal data into the specified migration destination (S3060). When the storing is finished, the second storage system 161 transmits a report indicating that the storing has been finished to the first storage system 125.

Based on the above-mentioned report, after confirming that the transmitted journal data has been stored into the second storage system 161, the first storage system 125 transmits a report indicating that the journal data migration has been finished to the management server 111 (S3070).

In addition, the first storage system 125 deletes the specified journal data from the JNL-related area 188. The first storage system 125 may execute the deletion in Step S3050 or after confirming that the transmitted journal data has been stored into the second storage system 161 (in other words, after the report transmitted by the second storage system 161 in Step S3060 is received).

Further, the JNL management program 205 of the first storage system 125 updates the JNL management table 224. Specifically, the identifier of the P-VOL corresponding to the migrated journal data is recorded as the P-VOL #461. The value of the creation time 434 corresponding to the migrated journal data is recorded as the snapshot acquisition time 462. The time at which the storing of Step S3060 is executed is recorded as the backup acquisition time 463.

Upon reception of the report transmitted in Step S3070, the catalog management program 303 of the management server 111 updates the catalog management information table 311 so as to reflect the journal data migration executed in Steps S3050 through S3060 (S3080).

Specifically, the journal storing external system number 504, the external generation number 505, the external JNL-VOL #507, and the backup acquisition time 508, which correspond to the journal data migrated in Step S3050, are updated as follows. In other words, the identifier of the second storage system 161 is recorded as the journal storing external system number 504. The generation number assigned by the second storage system 161 to the journal data that has been migrated is recorded as the external generation number 505. The identifier of the logical volume of the journal data migration destination is recorded as the external JNL-VOL #507. The time at which the storing of Step S3060 is executed is recorded as the backup acquisition time 508.

After that, the processing of migrating the journal data to the external storage system is brought to an end.

As described above, by migrating the journal data to the external storage system, it is possible to secure a free space in the first storage system 125. Accordingly, it is possible to enhance the amount and the number of generations of backup data that can be maintained and managed.

Figure 8:
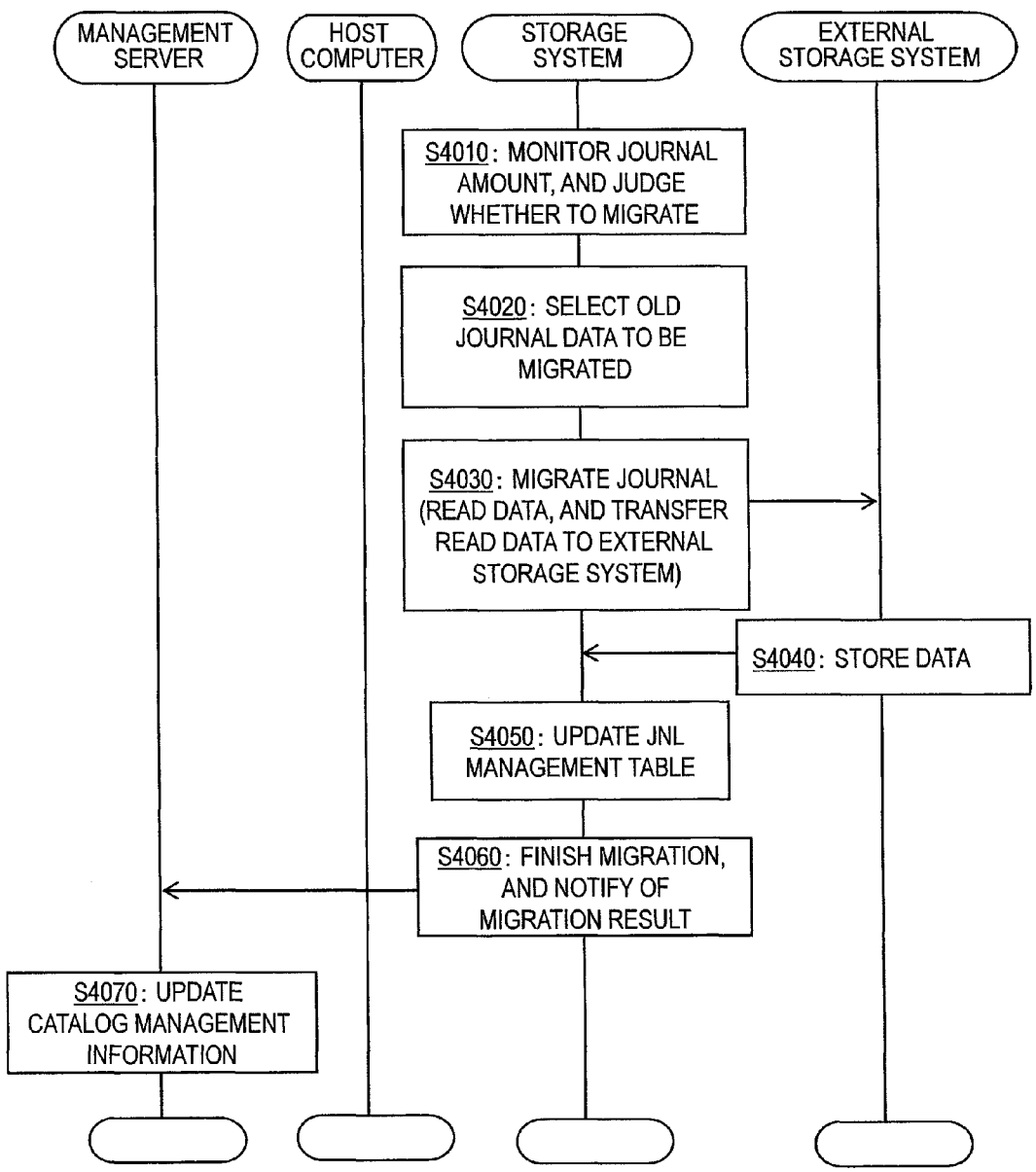
FIG. 8 is a flowchart illustrating another example of the processing of migrating the journal data to the external storage system, which is executed according to the first embodiment of this invention.

FIG. 8 is a flowchart illustrating another example of the processing of migrating the journal data to the external storage system, which is executed according to the first embodiment of this invention.

FIG. 8 illustrates a modified example of the processing illustrated in FIGS. 6 and 7. In FIGS. 6 and 7, the management server 111 judges whether or not to migrate the journal data, and selects the journal data to be migrated and the migration destination. Meanwhile, in FIG. 8, the first storage system 125 judges whether or not to migrate the journal data, and selects the journal data to be migrated and the migration destination. The processing of FIG. 8 will be described hereinbelow.

First, the migration necessity judgment program 203 of the first storage system 125 judges whether or not the journal data needs to be migrated to the external storage system (S4010). The judgment may be executed in the same manner as in Step S3010 of FIG. 7.

Subsequently, the migration subject decision program 204 of the first storage system 125 selects the journal data to be migrated (S4020). The selection may be executed in the same manner as in Step S3020 of FIG. 7.

Subsequently, the JNL backup program 206 of the first storage system 125 migrates the selected journal data to the selected migration destination (S4030). The migration may be executed in the same manner as in Step S3050 of FIG. 7.

According to the instruction transmitted from the first storage system 125, the second storage system 161 stores the transmitted journal data into the specified migration destination (S4040). When the storing is finished, the second storage system 161 transmits a report indicating that the storing has been finished to the first storage system 125.

Upon reception of the above-mentioned report, the JNL management program 205 of the first storage system 125 updates the JNL management table 224 (S4050). Specifically, the identifier of the P-VOL corresponding to the migrated journal data is recorded as the P-VOL #461. The value of the creation time 434 corresponding to the migrated journal data is recorded as the snapshot acquisition time 462. The time at which the storing of Step S4040 is executed is recorded as the backup acquisition time 463.

Further, for example, after confirming that the transmitted journal data has been stored into the second storage system 161, the first storage system 125 deletes the specified journal data from the JNL-related area 188.

Subsequently, the first storage system 125 transmits a report indicating that the journal data migration has been finished to the management server 111 (S4060).

Upon reception of the report transmitted in Step S4060, the catalog management program 303 of the management server 111 updates the catalog management information table 311 so as to reflect the journal data migration executed in Steps S4030 through S4040 (S4070). The update may be executed in the same manner as in Step S3080 of FIG. 7.

After that, the processing of migrating the journal data to the external storage system is brought to an end.

Figure 9:
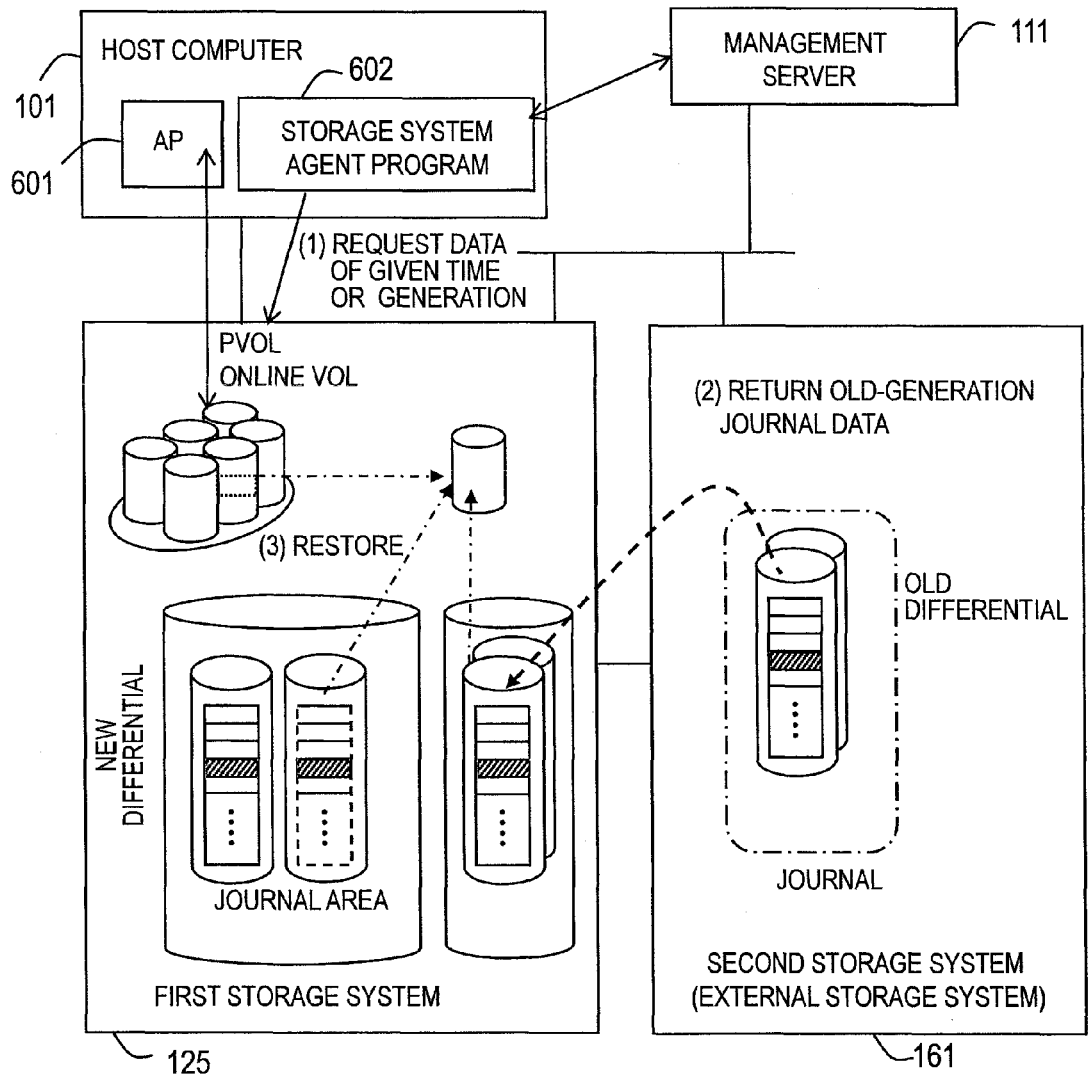
FIG. 9 is an explanatory diagram of an outline of a processing of restoring the journal data from the external storage system, which is executed according to the first embodiment of this invention.

FIG. 9 is an explanatory diagram of an outline of a processing of restoring the journal data from the external storage system, which is executed according to the first embodiment of this invention.

In the case where the journal data has been migrated to the external storage system by the method illustrated in FIGS. 6 through 8, in order to restore the P-VOL of a desired generation by using the journal data, the migrated journal data needs to be returned to the inside of the first storage system 125. By referring to FIG. 9, the outline of the processing therefor will be described.

First, the management server 111 transmits a request for data of a logical volume of a given generation (or time) to the host computer 101. More specifically, the management server 111 transmits a request for data that is not stored in the current P-VOL but was stored in the P-VOL of a given generation in the past.

The host computer 101 transmits the request received from the management server 111 to the first storage system 125.

If the journal data stored in the external storage system (in other words, second storage system 161) needs to be used to restore the requested generation, the first storage system 125 requests the second storage system 161 to transmit the necessary journal data. Then, the first storage system 125 uses the journal data transmitted according to the request to restore the logical volume of the requested generation, and returns the requested data.

Figure 10:
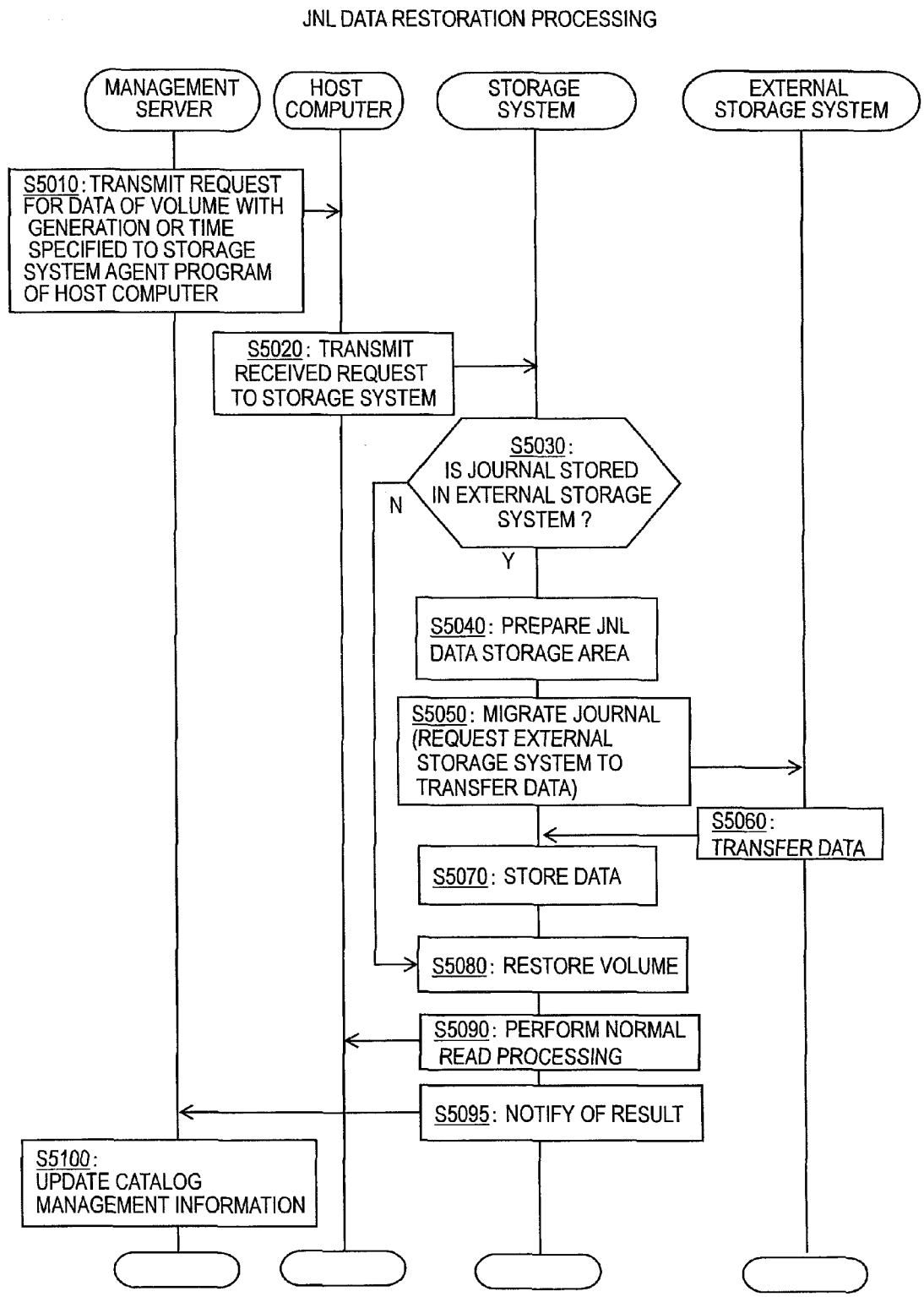
FIG. 10 is a flowchart illustrating the processing of restoring the journal data from the external storage system, which is executed according to the first embodiment of this invention.

FIG. 10 is a flowchart illustrating the processing of restoring the journal data from the external storage system, which is executed according to the first embodiment of this invention.

FIG. 10 illustrates details of the processing illustrated in FIG. 9.

First, the management server 111 transmits a request for data of a logical volume of a given generation (or time) to the host computer 101 (S5010). More specifically, the management server 111 transmits a request for data that is not stored in the current P-VOL but was stored in the P-VOL of a given generation in the past.

The host computer 101 transmits the request received from the management server 111 to the first storage system 125 (S5020).

The first storage system 125, which has received the request from the host computer 101, judges whether or not the journal data necessary to restore the requested generation is stored in the second storage system 161 (S5030).

It is possible to know by referencing the catalog management information table 311 where the journal data is stored. For example, the management server 111 may transmit information indicating the location of the journal data necessary to restore the requested generation by including the information in the request issued in Step S5010. In that case, based on the transmitted request, the first storage system 125 can judge whether or not the necessary journal data is stored in the second storage system 161.

Alternatively, the first storage system 125 may inquire the location of the necessary journal data from the management server 111.

Alternatively, the first storage system 125 may retain information equivalent to the catalog management information table 311 within the control memory 145. In that case, based on the information retained within the control memory 145, the first storage system 125 can execute the judgment of Step S5030.

If it is judged that the necessary journal data is included in the second storage system 161, the necessary journal data needs to be copied from the second storage system 161 to the first storage system 125. Therefore, the first storage system 125 first secures an area for storing the necessary journal data within the first storage system 125 (S5040).

Subsequently, the first storage system 125 transmits, to the second storage system 161, a request to transfer the necessary journal data (S5050).

The second storage system 161, which has received the request, reads the requested journal data, and transmits the read journal data to the first storage system 125 (S5060).

The first storage system 125 stores the journal data received from the second storage system 161 into the areas secured in Step S5040 (S5070).

Subsequently, the first storage system 125 uses the necessary journal data to restore the P-VOL of the requested generation (S5080).

Meanwhile, if it is judged in Step S5030 that the necessary journal data is not stored in the second storage system 161 (in other words, the necessary journal data is stored in the first storage system 125), the first storage system 125 executes Step S5080 without executing Steps S5040 through S5070.

Subsequently, the first storage system 125 executes a normal read processing for reading requested data with respect to the restored P-VOL, and transmits the data thus read to the host computer 101 (S5090).

In addition, the first storage system 125 transmits information for notifying that the journal data has been migrated by Steps S5060 and S5070, to the management server 111 (S5095).

The catalog management program 303 of the management server 111 updates the catalog management information table 311 in order to reflect the fact that the journal data has been migrated by Steps S5060 and S5070 (S5100).

After that, the processing of restoring the journal data from the external storage system is brought to an end.

By referring to FIG. 21, description will be made of an example case where the data stored in the P-VOL 187P of the generation N is requested. In this case, if the journal data items of at least one generation, which include at least the journal data corresponding to the generation N+1 (in the example of FIG. 21, JNL data elements 2702A and 2702B), are stored in the second storage system 161, those journal data items are transferred from the second storage system 161 to the first storage system 125 (S5060), and stored thereinto (S5070).

By reflecting the journal data items of at least one generation, which include at least the journal data corresponding to the generation N+1, on the current (in other words, online) P-VOL 187P, the first storage system 125 restores the data stored in the P-VOL 187P of the generation N (S5080), and executes the read processing (S5090).

According to the above-mentioned description with reference to FIGS. 6 through 8, only the journal data is migrated to the external storage system. Therefore, in order to restore the logical volume by using the journal data migrated to the external storage system, the journal data needs to be copied (in other words, returned) to the first storage system 125.

Meanwhile, the copy of the P-VOL (however, not copy of the current (in other words, online) P-VOL but copy of the restored P-VOL of a given generation) may be further stored into the external storage system of the journal data migration destination. By referring to FIG. 11 and the like, description will be made of such migration of the copy of the P-VOL.

Figure 11:
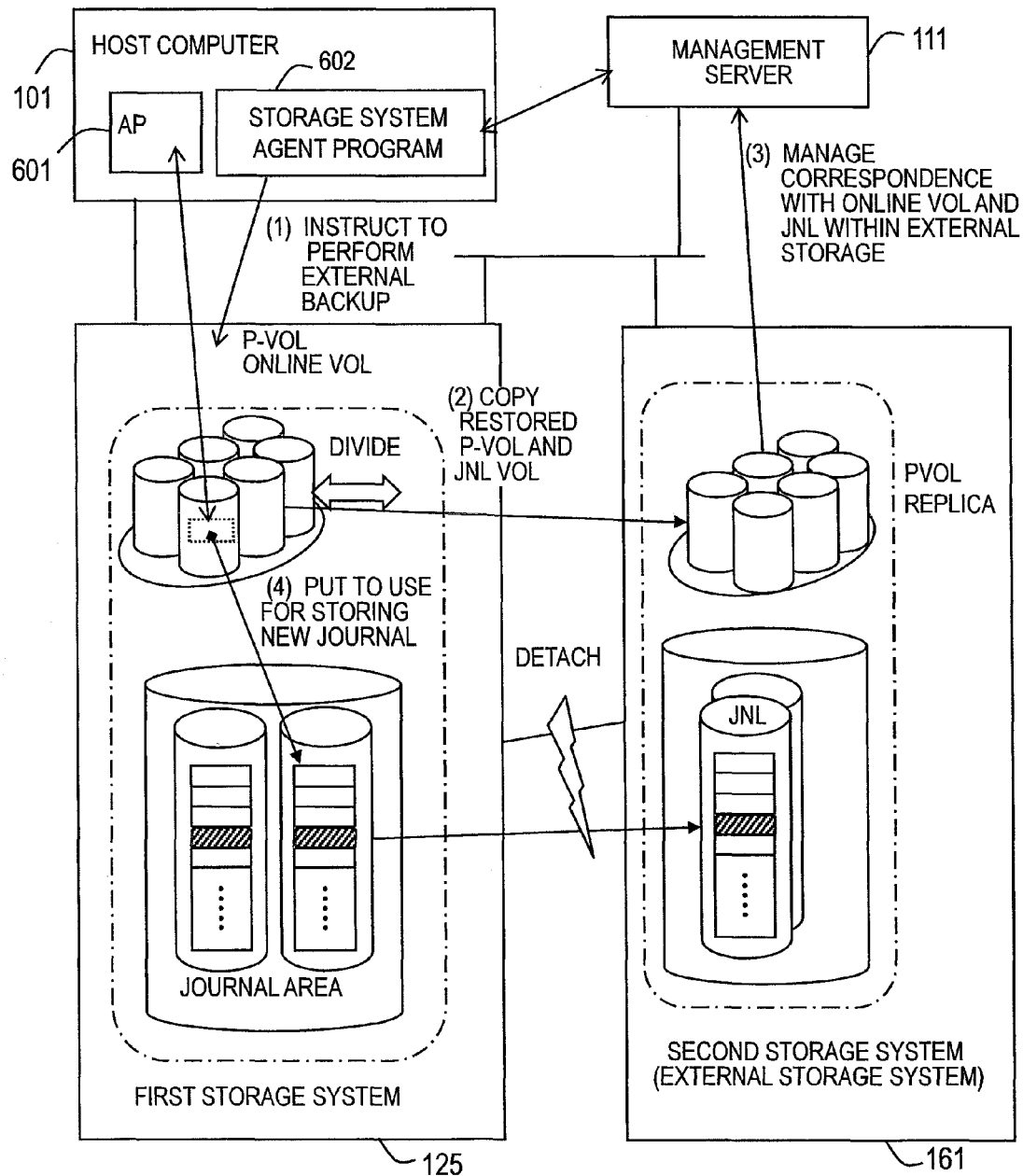
FIG. 11 is an explanatory diagram of an outline of a processing of migrating data to the external storage system, which is executed according to the first embodiment of this invention.

FIG. 11 is an explanatory diagram of an outline of a processing of migrating data to the external storage system, which is executed according to the first embodiment of this invention.

In the example of FIG. 11, as in the case of FIGS. 6 and 7, if a predetermined condition is satisfied, the management server 111 transmits the journal data migration instruction to the storage system agent program 602 of the host computer 101.

The host computer 101 transmits the journal data migration instruction to the first storage system 125.

The first storage system 125 transmits the copy of the journal data specified by the received instruction (for example, journal data of the oldest generation) to the second storage system 161.

In addition thereto, the first storage system 125 transmits the copy of the P-VOL which is necessary to restore the P-VOL by using the transmitted journal data.

The second storage system 161 stores the received copies of the journal data and the P-VOL.

When the copy of the journal data is stored into the second storage system 161, the first storage system 125 deletes the specified journal data from the JNL-related area 188 of the first storage system 125. A free space created by the deletion can be used for storing the journal data of the new generation.

In addition, in the example of FIG. 11, after the copies of the journal data and the P-VOL are stored into the second storage system 161, the second storage system 161 may be detached from the first storage system 125. Even if the second storage system 161 is detached from the first storage system 125, it is possible to restore the P-VOL by using only the data stored in the second storage system 161 as illustrated in FIGS. 14A through 14D and the like.

Figure 12:
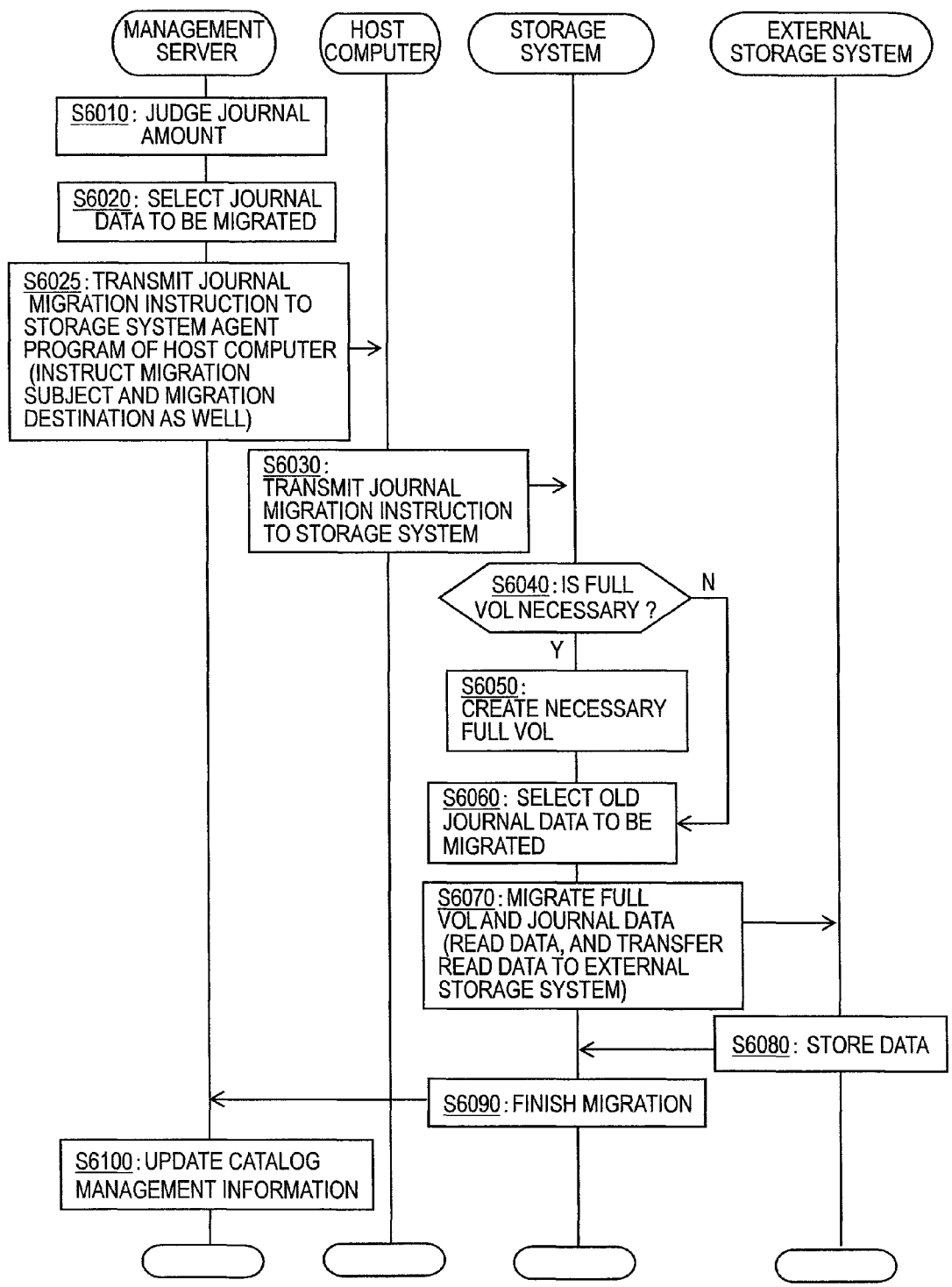
FIG. 12 is a flowchart illustrating the processing of migrating the data to the external storage system, which is executed according to the first embodiment of this invention.

FIG. 12 is a flowchart illustrating the processing of migrating the data to the external storage system, which is executed according to the first embodiment of this invention.

FIG. 12 illustrates details of the processing illustrated in FIG. 11.

First, the migration necessity judgment program 301 of the management server 111 judges whether or not the journal data needs to be migrated to the external storage system (S6010). The judgment may be executed in the same manner as in Step S3010 of FIG. 7.

If it is judged in Step S6010 that a predetermined condition is satisfied (in other words, the journal data needs to be migrated to the external storage system), the migration subject decision program 302 of the management server 111 selects the journal data to be migrated and its migration destination (S6020). The selection may be executed in the same manner as in Step S3020 of FIG. 7.

Subsequently, the management server 111 transmits the journal data migration instruction to the host computer 101 (S6025). The journal data migration instruction includes specification of the journal data to be migrated and the migration destination (in other words, journal data and migration destination selected in Step S6020).

The host computer 101 transmits the journal data migration instruction received from the management server 111 to the first storage system 125 (S6030).

Upon reception of the instruction transmitted in Step S6030, the first storage system 125 judges whether or not the P-VOL needs to be created (in other words, restored) (S6040). Herein, the judgment will be described.

In the processing of FIG. 12, another copy of the P-VOL which is necessary to restore the P-VOL by using the transmitted journal data, is migrated to the external storage system in addition to the journal data.

In the example case of FIG. 21 where the journal data of the generation N+1, in other words, the JNL data elements 2702A and 2702B are migrated, in order to restore the P-VOL 187P of the generation N by use thereof, the P-VOL 187P of the generation N+1 is necessary. This is because the P-VOL 187P of the generation N is restored by replacing the data elements 2701E and 2701F of the P-VOL 187P of the generation N+1 by the JNL data elements 2702A and 2702B, respectively.

Therefore, if the journal data of the generation N+1 is specified as the one to be migrated by the instruction transmitted in Step S6030, it is judged in Step S6040 whether or not the P-VOL 187P of the generation N+1 needs to be created.

For example, if the P-VOL 187P of the generation N+1 has already been created, it may be judged that the P-VOL 187P of the generation N+1 does not need to be created, and if the P-VOL 187P of the generation N+1 has not been created yet, it may be judged that the P-VOL 187P of the generation N+1 needs to be created.

Alternatively, if the P-VOL 187P of the generation N+1 has already been copied to the second storage system 161, it may be judged that the P-VOL 187P of the generation N+1 does not need to be created. On the other hand, if the P-VOL 187P of the generation N+1 has not been copied yet to the second storage system 161, and if the P-VOL 187P of the generation N+1 has not been created yet, it may be judged that the P-VOL 187P of the generation N+1 needs to be created.

It should be noted that, in the example of FIG. 21, if the journal data of the generation N+2 (in other words, JNL data elements 2702C and 2702E) is also specified as the one to be migrated in addition to the journal data of the generation N+1, the P-VOL necessary to restore the P-VOL by using the journal data is only the P-VOL 187P of the generation N+2. This is because the P-VOL 187P of the generation N+1 can be restored by replacing the data elements of the P-VOL 187P of the generation N+2 by the journal data of the generation N+2, and the P-VOL 187P of the generation N can be restored by replacing the data elements of the restored P-VOL 187P of the generation N+1 by the journal data of the generation N+1.

If it is judged in Step S6040 that the P-VOL needs to be created, the first storage system 125 restores the P-VOL judged as necessary (S6050). The restoration is executed as described with reference to FIG. 21.

On the other hand, if it is judged in Step S6040 that the P-VOL does not need to be created, the procedure advances to Step S6060 without executing Step S6050.

Subsequently, the first storage system 125 selects the journal data specified as the migration subject (S6060). Specifically, the first storage system 125 selects the journal data specified by the instruction transmitted in Step S6030 (in other words, journal data selected in Step S6020).

Subsequently, the first storage system 125 reads the selected journal data and the whole data of the P-VOL created in Step S6050, and transmits those data to the second storage system 161 (S6070). If it is judged in Step S6040 that the P-VOL does not need to be created, the whole data of the P-VOL that has already been created are read and transmitted.

The second storage system 161, which has received the data transmitted in Step S6070, stores the data of the P-VOL and the journal data that have been received. For example, the second storage system 161 may store the received data of the P-VOL into the logical volume specified as the migration destination, and store the received journal data into the JNL-related area 188 associated with the free logical volume. After finishing the storing, the second storage system 161 transmits a report indicating that the storing has been finished to the first storage system 125.

Based on the above-mentioned report, after confirming that the transmitted journal data has been stored into the second storage system 161, the first storage system 125 transmits a report indicating that the journal data migration has been finished to the management server 111 (S6090).

In addition, for example, after confirming that the transmitted journal data has been stored into the second storage system 161, the first storage system 125 deletes the specified journal data from the JNL-related area 188.

Further, the JNL management program 205 of the first storage system 125 updates the JNL management table 224. The update may be executed in the same manner as in Step S3070 of FIG. 7. In addition, the JNL management program 205 in the example of FIG. 12 also updates the P-VOL/JNL pair management table 225.

Upon reception of the report transmitted in Step S6090, the catalog management program 303 of the management server 111 updates the catalog management information table 311 so as to reflect the journal data migration executed in Steps S6070 through S6080 (S6100). The update may be executed in the same manner as in Step S3080 of FIG. 7.

After that, the processing of migrating the data to the external storage system is brought to an end.

Figure 13:
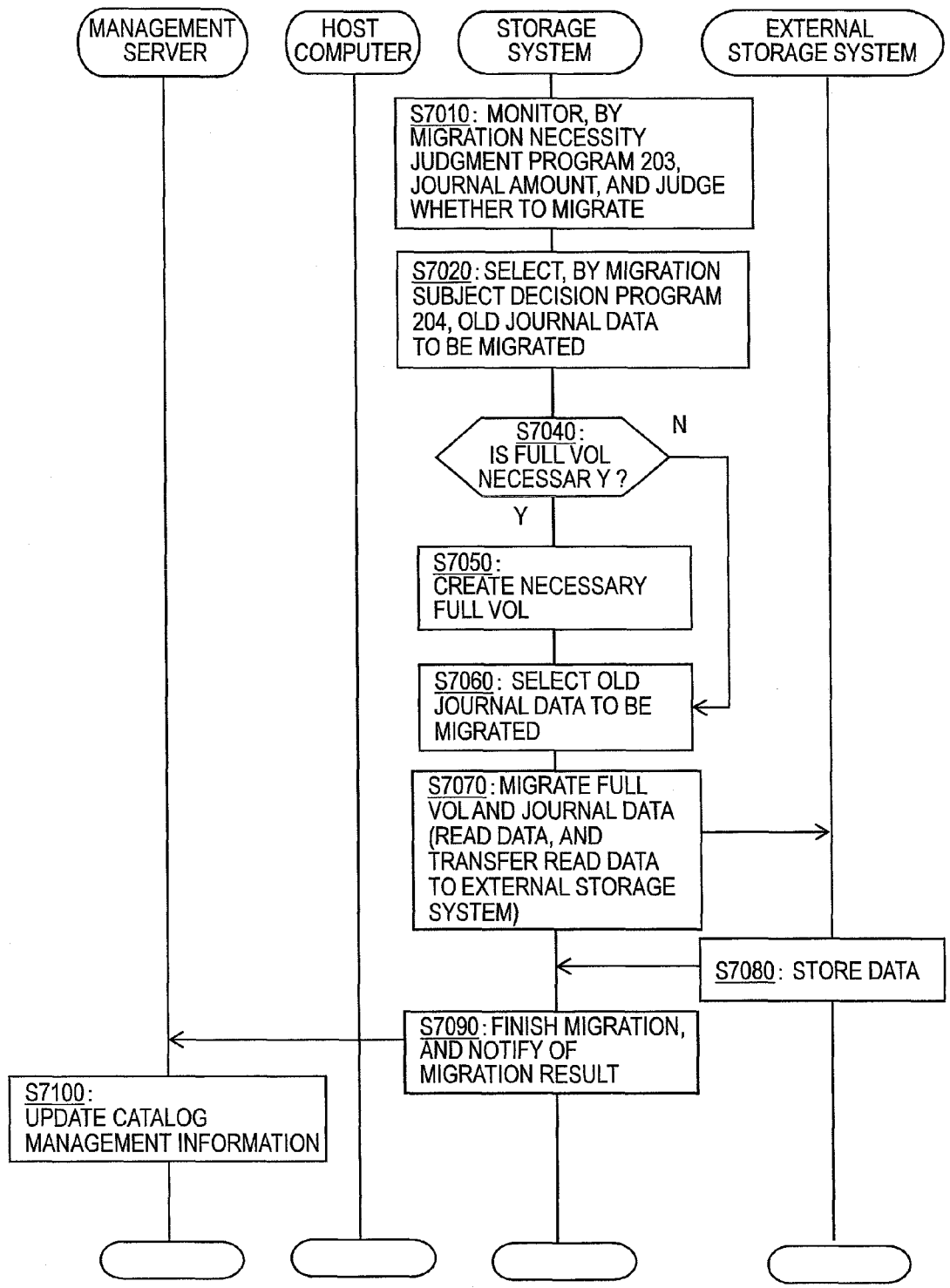
FIG. 13 is a flowchart illustrating another example of the processing of migrating the data to the external storage system, which is executed according to the first embodiment of this invention.

FIG. 13 is a flowchart illustrating another example of the processing of migrating the data to the external storage system, which is executed according to the first embodiment of this invention.

FIG. 13 is a modified example of the processing illustrated in FIGS. 11 and 12. In FIGS. 11 and 12, the management server 111 judges whether or not to migrate the journal data, and selects the journal data to be migrated and the migration destination. Meanwhile, in FIG. 13, the first storage system 125 judges whether or not to migrate the journal data, and selects the journal data to be migrated and the migration destination. The processing of FIG. 13 will be described hereinbelow.

First, the migration necessity judgment program 203 of the first storage system 125 judges whether or not the journal data needs to be migrated to the external storage system (S7010). The judgment may be executed in the same manner as in Step S6010 of FIG. 12.

Subsequently, the migration subject decision program 204 of the first storage system 125 selects the journal data to be migrated (S7020). The selection may be executed in the same manner as in Step S6020 of FIG. 12.

The subsequent Steps S7040 through S7100 are the same as Steps S6040 through S6100, respectively, and hence description thereof is omitted. After Step S7100 is finished, the processing of migrating the data to the external storage system is brought to an end.

As illustrated in FIGS. 11 through 13, by migrating not only the journal data but also the copy of the P-VOL at a given time point to the external storage system, it is possible to restore the P-VOL by using only the data stored in the external storage system. This allows the second storage system 161 to be detached from the first storage system 125. The detach may be executed by releasing the physical coupling between the second storage system 161 and the first storage system 125, or may be executed by canceling the setting of the external coupling of the second storage system 161 with respect to the first storage system 125.

The second storage system 161 that has been detached from the first storage system 125 may be newly coupled directly to a host computer. This host computer may be the host computer 101 coupled to the first storage system 125, or may be a computer different therefrom. Alternatively, the second storage system 161 may be newly externally coupled to a storage system other than the first storage system 125 (for example, third storage system 2201 illustrated in FIG. 17, which will be described later).

In any of the cases, the second storage system 161 can provide the P-VOL of any one of the generations, which has been restored by using the data migrated from the first storage system 125, to the host computer directly or via the third storage system 2201.

FIGS. 14A through 14D are explanatory diagrams of types of the detach performed between storage systems according to the first embodiment of this invention.

Figure 14A:
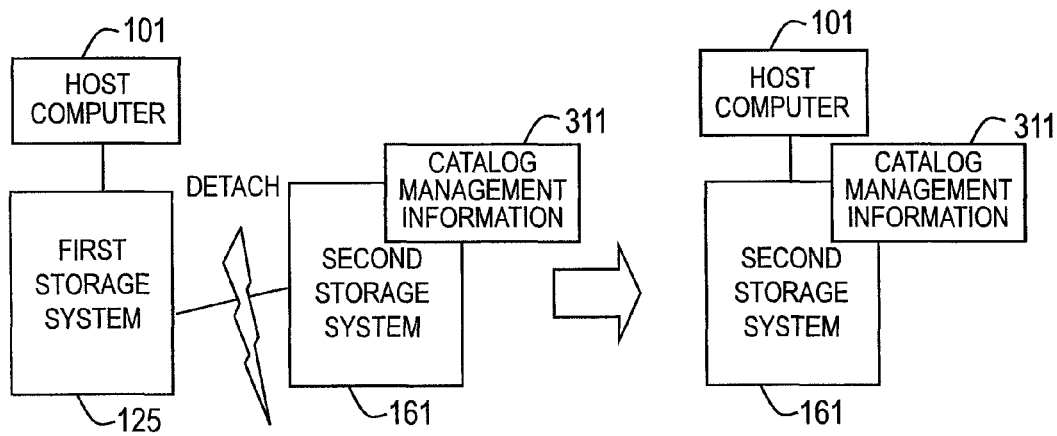
FIGS. 14A through 14D are explanatory diagrams of types of a detach performed between storage systems according to the first embodiment of this invention.

FIG. 14A illustrates an example case where the second storage system 161 has a function equivalent to that of the first storage system 125, and also retains information equivalent to the catalog management information table 311 (in FIGS. 14A through 14D, referred to as "catalog management information 311"). In this case, the host computer 101 can be newly coupled to the second storage system 161 directly (in other words, without the intermediation of another storage system). In this case, the second storage system 161 can provide the restored P-VOL to the host computer 101 by using: the catalog management information table 311; and the copy of the P-VOL and the journal data that have been migrated from the first storage system 125.

Figure 14B:
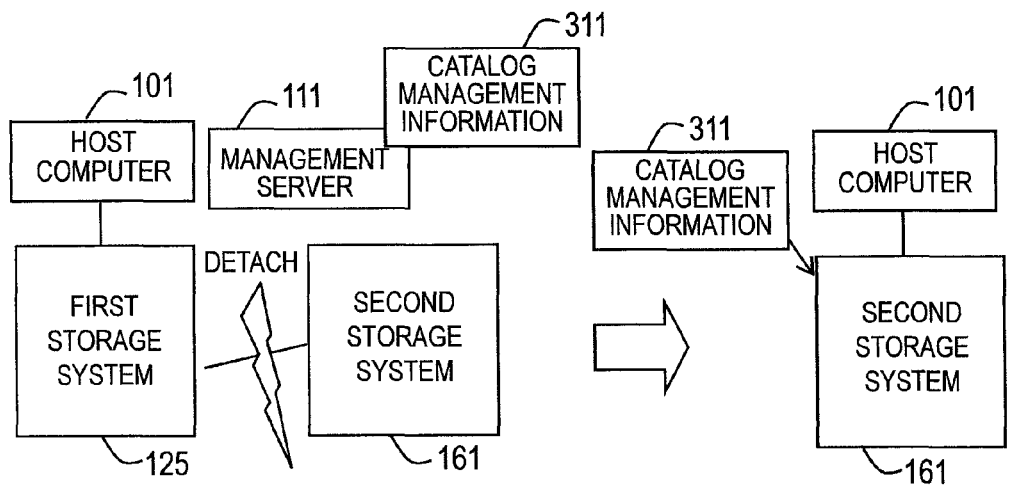

In the example of FIG. 14B, the second storage system 161 has the function equivalent to that of the first storage system 125, but does not retain the catalog management information table 311. In this case, by copying the catalog management information table 311 from the management server 111 to the second storage system 161, in the same manner as the case of FIG. 14A, the second storage system 161 can provide the restored P-VOL to the host computer 101.

Figure 14C:
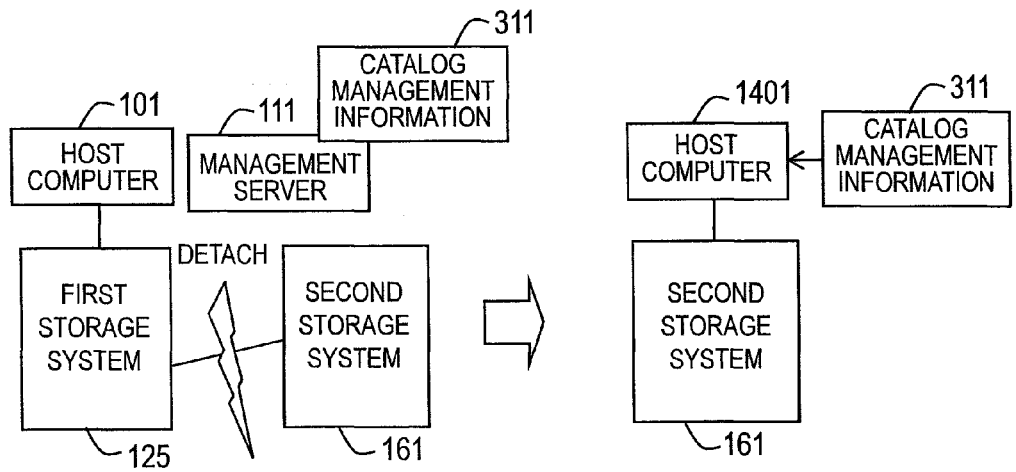

FIG. 14C illustrates an example case where the second storage system 161 is detached from the first storage system 125, and then coupled to a host computer 1401 that is provided separately from the host computer 101. In this example, the second storage system 161 does not have the function equivalent to that of the first storage system 125. In this case, with the host computer 1401 retaining the catalog management information table 311, in the same manner as the case of FIG. 14A, the second storage system 161 can provide the restored P-VOL to the host computer 1401.

The catalog management information table 311 may be copied from the management server 111 to the host computer 1401. In that case, the host computer 1401 receives a request to read the data stored in the P-VOL of any one of the generations. The read request may be, for example, transmitted from the management server 111, input to the host computer 1401 by the user, or issued by the application program 601.

The host computer 1401 transmits the received read request to the second storage system 161. The second storage system 161, which has received the read request, identifies the logical volume in which the copy of the P-VOL necessary to restore the data of the P-VOL of the requested generation is stored and the logical volume in which the journal data necessary for the restoration is stored. The identification may be performed by, for example, any one of the following methods.

For example, based on the catalog management information table 311, the host computer 1401 may identify the logical volume in which the copy of the P-VOL necessary to restore the data of the P-VOL of the requested generation is stored and the logical volume in which the journal data necessary for the restoration is stored, and transmit the specification of the identified logical volume by including the specification in the read request.

Alternatively, the second storage system 161, which has received the read request, may acquire necessary information in the catalog management information table 311 (or the entire catalog management information table 311) from the host computer 1401, and identify the above-mentioned logical volumes based on the acquired information.

Figure 14D:
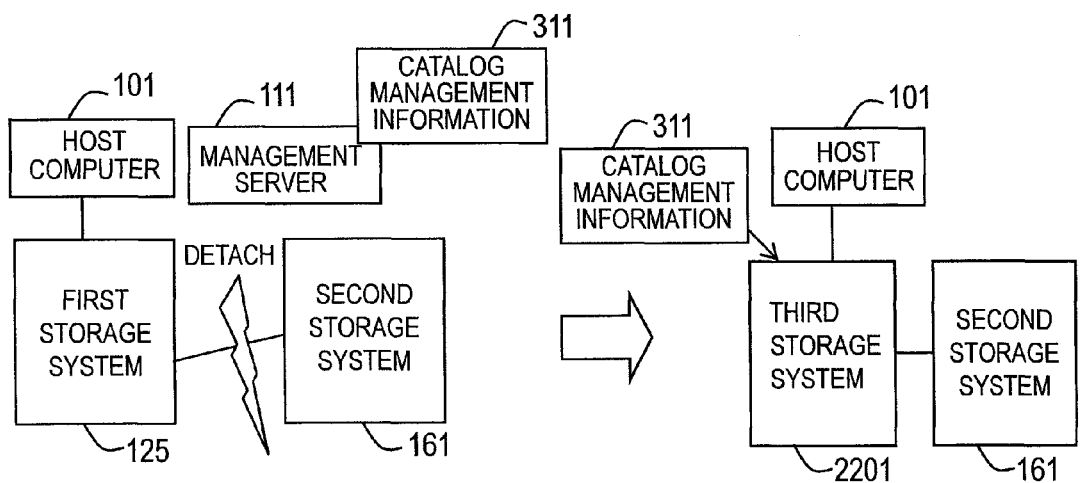

In the example of FIG. 14D, the second storage system 161 is newly externally coupled to the third storage system 2201 having the function equivalent to that of the first storage system 125. In this case, with the third storage system 2201 retaining the catalog management information table 311, the second storage system 161 can provide the restored P-VOL to the host computer 101 via the third storage system 2201.

It should be noted that the example of restoring the P-VOL coupled as in FIG. 14D will be described later with reference to FIG. 17.

Figure 15:
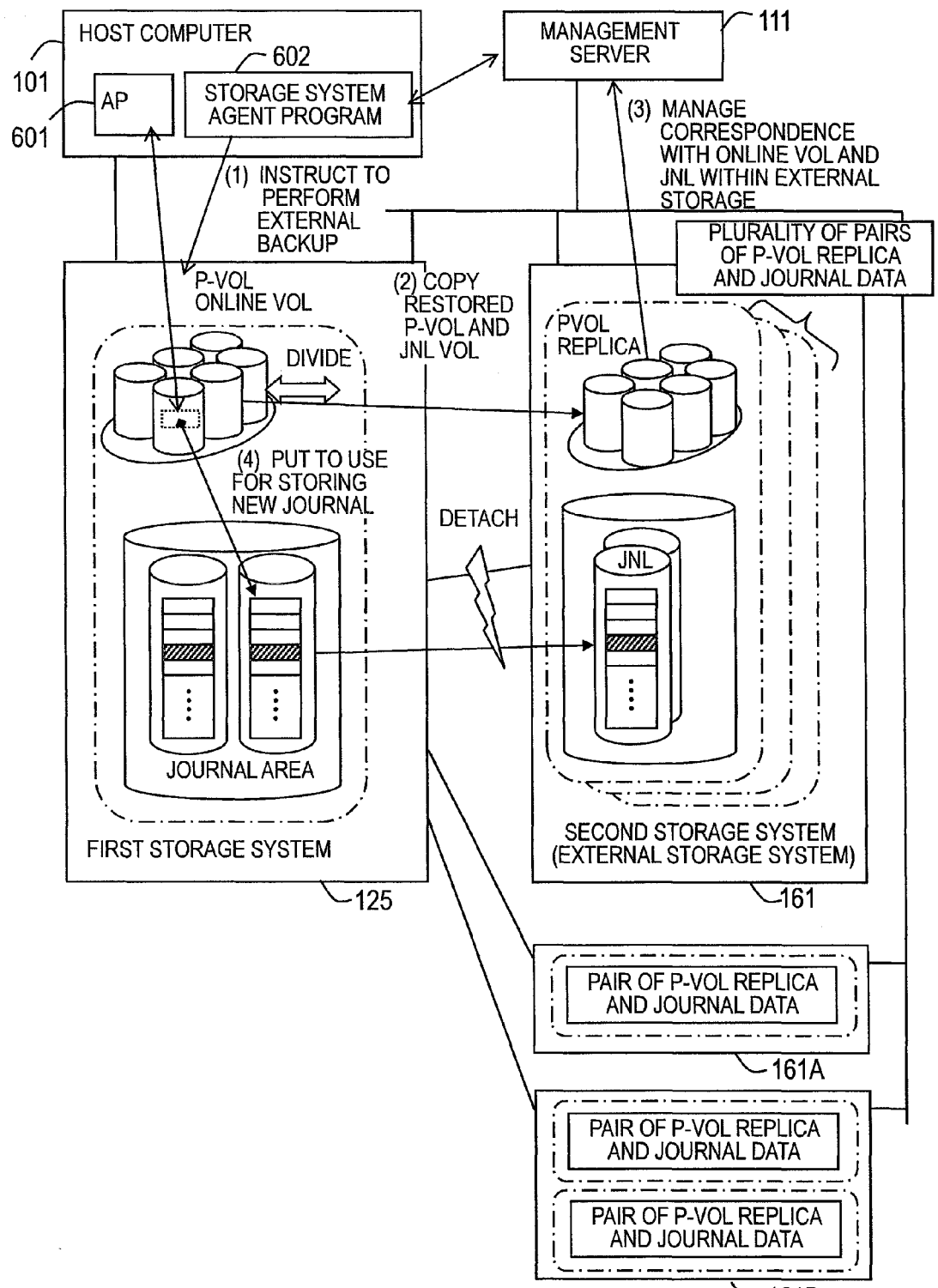
FIG. 15 is a flowchart illustrating a further example of the processing of migrating the data to the external storage system, which is executed according to the first embodiment of this invention.

FIG. 15 is a flowchart illustrating a further example of the processing of migrating the data to the external storage system, which is executed according to the first embodiment of this invention.

If the processing illustrated in FIG. 11 is repeatedly executed, as illustrated in the second storage system 161 of FIG. 15, there may be a case where a plurality of pairs of the journal data and the copy (replica) of the P-VOL necessary to restore the journal data are stored within the second storage system 161.

Alternatively, there may be a case where a plurality of external storage systems are coupled to the first storage system 125. In the example of FIG. 15, in addition to the second storage system 161, external storage systems 161A and 161B are externally coupled to the first storage system 125. It should be noted that the external storage systems 161A and 161B may be the same as the second storage system 161.

In such a case as described above, if the processing illustrated in FIG. 11 is executed on each of the external storage systems, there may be a case where one or a plurality of such pairs of the journal data and the replica of the P-VOL as described above are stored in the external storage system. In such a case, in order to restore the P-VOL of a given generation, if the data of the replica of the P-VOL is replaced by journal data belonging to a pair different from the pair to which the replica of the P-VOL belongs, a wrong P-VOL is restored.

To prevent such erroneous restoration, it is necessary to manage the pair of the journal data and the replica of the P-VOL. Therefore, as illustrated in FIG. 4E, the P-VOL/JNL pair management table 225, which has already been described, is used.

In the P-VOL/JNL pair management table 225, the P-VOL #471 is the identifier of the copy source online P-VOL, in other words, in the example of FIG. 15, the identifier of the P-VOL stored in the first storage system 125.

The copy P-VOL #473 is the identifier of the copy P-VOL derived from the P-VOL stored in the first storage system 125 (the copy of the P-VOL created by the processing illustrated in FIG. 11 based on the P-VOL stored in the first storage system 125 and the journal data).

The JNL-VOL #475 represents the identifier of the logical volume that stores therein the journal data belonging to the pair to which the copy P-VOL identified by the copy P-VOL #473 belongs.

Figure 16A:
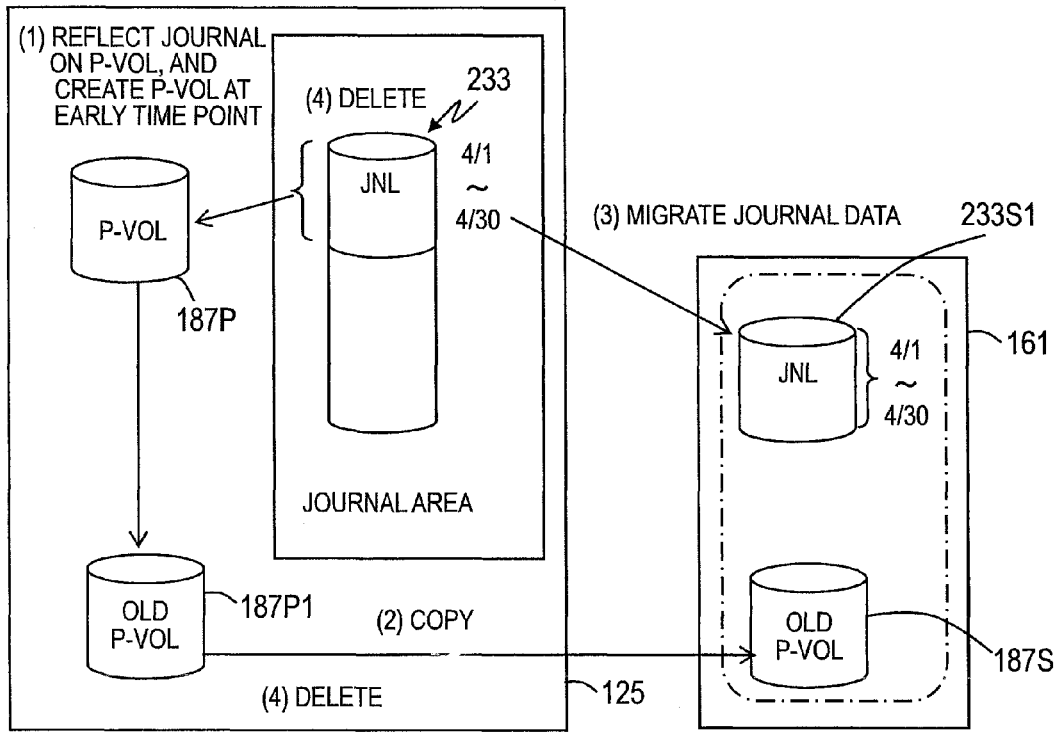
FIGS. 16A and 16B are explanatory diagrams of specific examples of the processing of migrating the data to the external storage system, which is executed according to the first embodiment of this invention.
Figure 16B:
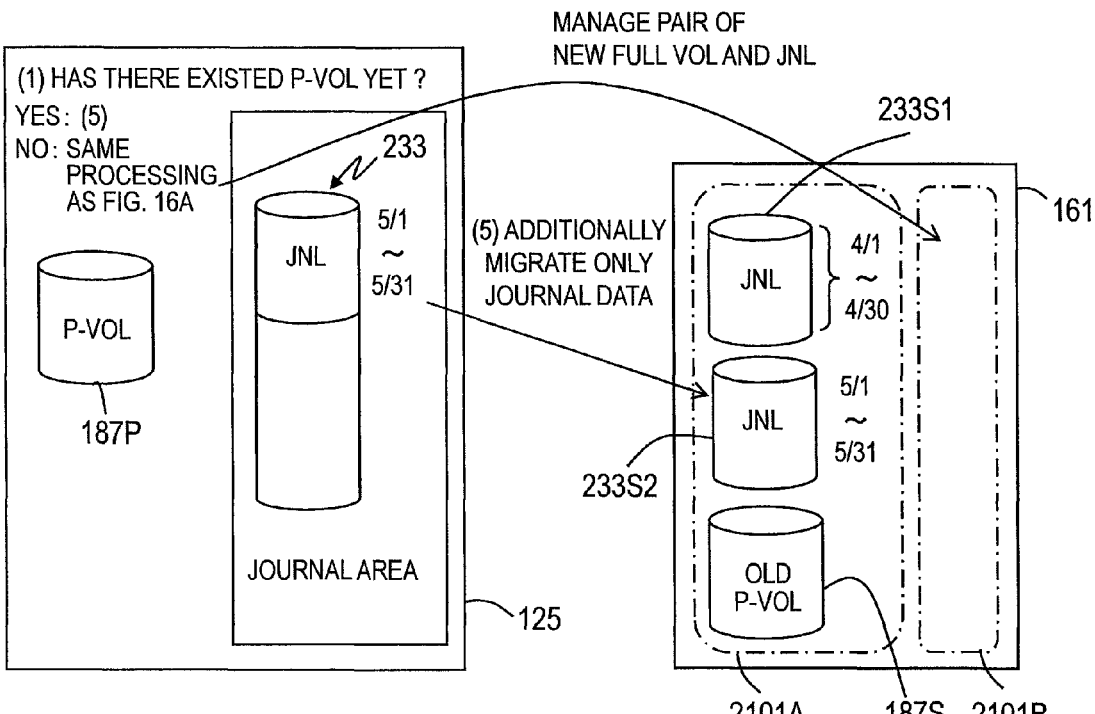

FIGS. 16A and 16B are explanatory diagrams of specific examples of the processing of migrating the data to the external storage system, which is executed according to the first embodiment of this invention.

First, the case of creating the After journal will be described.

For example, as illustrated in FIG. 16A, if the current date and time falls in the time point at which April 30 has ended (in other words, 0 a.m. on May 1), by reflecting the JNL data piece 233 created on April 1 through April 30 on the current (in other words, online) P-VOL 187P, it is possible to restore a P-VOL 187P1 at the time point at which March 31 has ended (in other words, 0 a.m. on April 1).

After that, the first storage system 125 copies the JNL data piece 233 created on April 1 through April 30 as a JNL data piece 233S1 to the second storage system 161, and also copies the restored P-VOL 187P1 as a P-VOL 187S to the second storage system 161.

Accordingly, even if the second storage system 161 is detached from the first storage system 125, the second storage system 161 can provide at least the P-VOL 187S at 0 a.m. on April 1 and the P-VOL at 0 a.m. on May 1 created by reflecting the JNL data piece 233S1 thereon.

The JNL data piece 233 created on April 1 through April 30 and the restored P-VOL 187P1 are deleted from the first storage system 125. This increases the free space within the first storage system 125, which makes it possible to store the journal data of a newer generation.

After the elapse of another 1 month, as illustrated in FIG. 16B, the first storage system 125 copies the JNL data piece 233 created on May 1 through May 31 as a JNL data piece 233S2 to the second storage system 161. In this case, there is no need to copy another restored P-VOL. This is because, as illustrated in FIG. 16A, the P-VOL 187S at 0 a.m. on April 1 and the JNL data piece 233S1 created on April 1 through April 30 have already been stored, which can be used along with the JNL data piece 233S2 to restore the P-VOL at 0 a.m. on June 1.

However, when the JNL data piece 233S2 is to be copied, if the P-VOL 187S and the JNL data piece 233S1 are not stored in the second storage system 161, the first storage system 125 needs to follow the same procedure as in FIG. 16A to restore the P-VOL at 0 a.m. on May 1 and copy the P-VOL to the second storage system 161.

Alternatively, as illustrated in FIG. 16B, even if the P-VOL 187S, the JNL data piece 233S1, and the JNL data piece 233S2 are stored in the second storage system 161, the same procedure as in FIG. 16A needs to be followed to restore and copy the P-VOL in a case where the current date and time is 0 a.m. on August 1, and where the JNL data piece 233 created on June 1 through June 30 has already been deleted from both the first storage system 125 and the second storage system 161.

Specifically, in this case, the first storage system 125 reflects the JNL data piece 233 created on July 1 through July 31 on the online P-VOL 187P to thereby restore the P-VOL at 0 a.m. on July 1 (not shown) and copy the P-VOL to the second storage system 161. In addition, the JNL data piece 233 created on July 1 through July 31 is also copied to the second storage system 161. In this case, the copy of the P-VOL at 0 a.m. on July 1 and the JNL data piece 233 created on July 1 through July 31 are managed as one pair in the second storage system 161 (in the example of FIG. 16B, pair 2101B). On the other hand, the P-VOL 187S, the JNL data piece 233S1, and the JNL data piece 233S2 are managed as another pair (in the example of FIG. 16B, pair 2101A).

Next, the case of creating the Before journal will be described.

For example, as illustrated in FIG. 16A, if the current date and time is 0 a.m. on May 11, by reflecting the JNL data piece 233 created on May 1 through May 10 (not shown) on the current (in other words, online) P-VOL 187P, it is possible to restore a P-VOL 187P1 at the time point at which April 30 has ended (in other words, 0 a.m. on May 1).

After that, the first storage system 125 copies the JNL data piece 233 created on April 1 through April 30 as the JNL data piece 233S1 to the second storage system 161, and also copies the restored P-VOL 187P1 as the P-VOL 187S to the second storage system 161.

Accordingly, even if the second storage system 161 is detached from the first storage system 125, the second storage system 161 can provide at least the P-VOL 187S at 0 a.m. on May 1 and the P-VOL at 0 a.m. on April 1 created by reflecting the JNL data piece 233S1 thereon.

The JNL data piece 233 created on April 1 through April 30 and the restored P-VOL 187P1 are deleted from the first storage system 125. This increases the free space within the first storage system 125, which makes it possible to store the journal data of a newer generation.

After the elapse of another 1 month, as illustrated in FIG. 16B, the first storage system 125 copies the JNL data piece 233 created on May 1 through May 31 as a JNL data piece 233S2 to the second storage system 161. In this case, the first storage system 125 needs to follow the same procedure as described above to restore the P-VOL 187P1 at 0 a.m. on June 1 and copy the P-VOL 187P1 to the second storage system 161. This is because, in the case of creating the Before journal, the P-VOL 187P1 at 0 a.m. on June 1 is necessary to restore the P-VOL at 0 a.m. on May 1 by using the JNL data piece 233S2.

In this case, the earlier-copied P-VOL 187S (in other words, copy of P-VOL 187P1 at 0 a.m. on May 1) and the JNL data piece 233S1 may be managed as a first pair (for example, pair 2101A), and the copy of the later-copied P-VOL 187P1 at 0 a.m. on June 1 and the JNL data piece 233S2 may be managed as a second pair (for example, pair 2101B).

Alternatively, the P-VOL 187P1 at 0 a.m. on June 1 may be copied as a new P-VOL 187S to the second storage system 161. In this case, the earlier-copied P-VOL 187S at 0 a.m. on May 1 is deleted. Then, the new P-VOL 187S, the JNL data piece 233S1, and the JNL data piece 233S2 may be managed as one pair (for example, pair 2101A).

Next, description will be made of a processing of restoring the P-VOL and the journal data from the external storage system in a case where the P-VOL restored as described above is copied to the external storage system.

Figure 17:
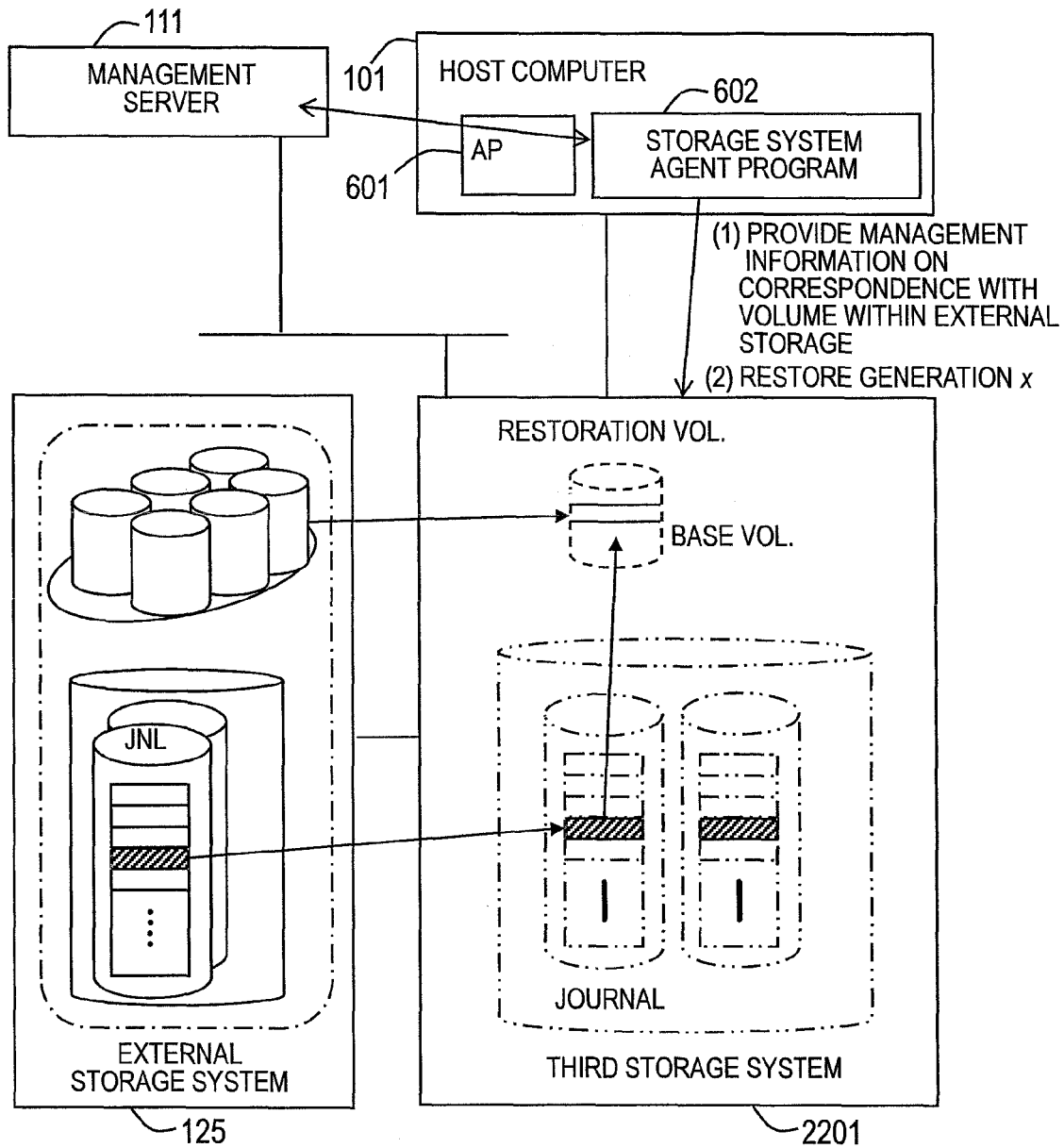
FIG. 17 is an explanatory diagram of an outline of a processing of restoring a P-VOL and the journal data from the external storage system, which is executed according to the first embodiment of this invention.

FIG. 17 is an explanatory diagram of an outline of the processing of restoring the P-VOL and the journal data from the external storage system, which is executed according to the first embodiment of this invention.

Specifically, FIG. 17 illustrates the restoration of the P-VOL and the journal data in a case where the second storage system 161 is detached from the first storage system 125, and newly externally coupled to the third storage system 2201 having the function equivalent to that of the first storage system 125.

In this case, the management server 111 provides at least the catalog management information table 311 to the third storage system 2201 via the host computer 101, and further requests the third storage system 2201 for the data of the P-VOL of a given generation in the past.

The third storage system 2201 requests the second storage system 161 to transmit the necessary journal data and data of the P-VOL in order to restore the requested generation. Then, the third storage system 2201 uses the journal data and the data of the P-VOL that have been transmitted according to the request to restore the P-VOL of the requested generation and return the requested data.

Figure 18:
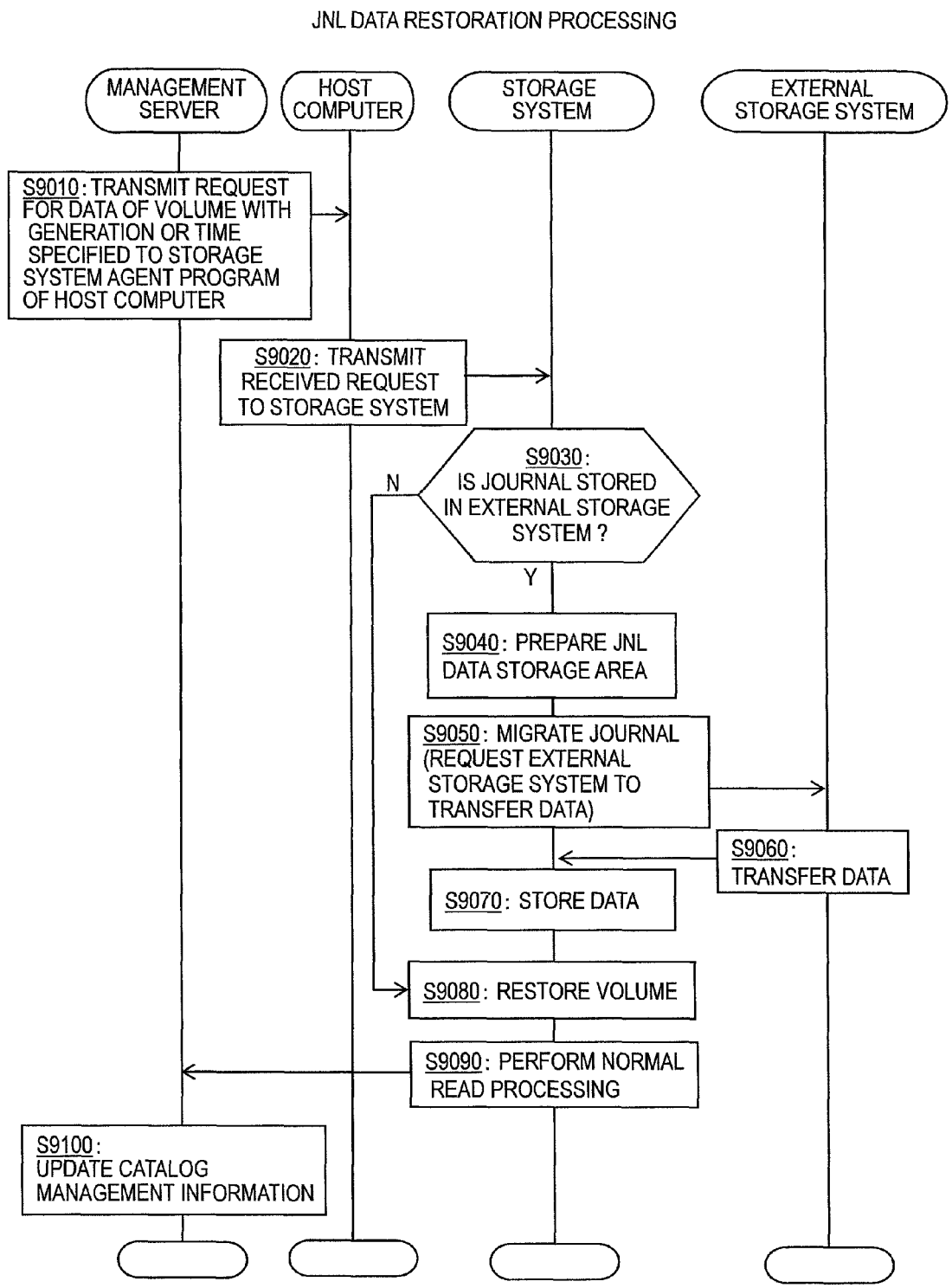
FIG. 18 is a flowchart illustrating the processing of restoring the P-VOL and the journal data from the external storage system, which is executed according to the first embodiment of this invention.

FIG. 18 is a flowchart illustrating the processing of restoring the P-VOL and the journal data from the external storage system, which is executed according to the first embodiment of this invention.

FIG. 18 illustrates details of the processing illustrated in FIG. 17.

The processing illustrated in FIG. 18 is substantially the same as the processing described by referring to FIG. 10. Specifically, Steps S9010 through S9100 of FIG. 18 correspond to Steps S5010 through S5100 of FIG. 10, respectively.

However, in FIG. 10, Steps S5030 through S5090 (excluding Step S5060) are executed by the first storage system 125, while Steps S9030 through S9090 (excluding Step S9060) of FIG. 18 are executed by the third storage system 2201. Even in this case, based on the catalog management information table 311 retained by the management server 111, the third storage system 2201 can know the location of the journal data.

Further, if the P-VOL/JNL pair management table 225 is copied from the first storage system 125 to the third storage system 2201, based on the P-VOL/JNL pair management table 225, the third storage system 2201 can know a correspondence between the journal data and the P-VOL necessary to restore the P-VOL by using the journal data. Therefore, in Step S9030, the third storage system 2201 can also identify the location of the P-VOL necessary for the restoration.

For example, the management server 111 retains the copy of the P-VOL/JNL pair management table 225, and when the second storage system 161 is newly externally coupled to the third storage system 2201, the second storage system 161 may transmit the copy of the P-VOL/JNL pair management table 225 to the third storage system 2201. This allows the third storage system 2201 to retain the copy of the P-VOL/JNL pair management table 225.

Then, in addition to the area for storing the necessary journal data, the third storage system 2201 secures an area for storing the necessary P-VOL transmitted from the second storage system 161 (S9040).

Then, the third storage system 2201 requests the second storage system 161 to transmit the necessary journal data and the necessary P-VOL (S9050).

The second storage system 161, which has received the request, reads the requested journal data and data of the P-VOL, and transmits the read data to the third storage system 2201 (S9060).

The third storage system 2201 stores the journal data and the data of the P-VOL that have been received from the second storage system 161 (S9070), and uses the data to restore the P-VOL (S9080).

For example, if the second storage system 161 stores the journal data and the copy of the P-VOL such as illustrated in FIG. 16B, the third storage system 2201 can learn that the P-VOL 187S is necessary to restore the P-VOL on June 1 by using the JNL data pieces 233S1 and 233S2. Then, in Step S9060, the P-VOL 187S is transmitted in addition to the journal data including the JNL data pieces 233S1 and 233S2.

It should be noted that FIGS. 17 and 18 illustrate the example where the third storage system 2201 executes the processing of restoring the P-VOL of the requested generation by using the P-VOL and the journal data that have been transferred from the second storage system 161, but the second storage system 161 may restore the P-VOL of the requested generation instead. In that case, the second storage system 161 may copy the restored P-VOL to the third storage system 2201, or may transmit, to the third storage system 2201, only the data requested by the management server 111 against the third storage system 2201.

Specifically, in Step S9050, the third storage system 2201 may transmit the same request as the request received in Step S9020 to the second storage system 161. The request contains necessary journal data and information indicating the location of a necessary P-VOL. The information is created based on the catalog management information table 311.

In the same manner as the case of FIG. 10, the information equivalent to the catalog management information table 311 may be retained in the third storage system 2201. In that case, the necessary journal data and the information indicating the location of the necessary P-VOL may be created based on the information retained in the third storage system 2201. Based on the received request, the second storage system 161 restores the P-VOL.

In the case where the second storage system 161 restores the P-VOL as described above, Steps S9040 and S9080 need not be executed.

As described above by referring to FIGS. 11 through 18, by migrating not only the journal data but also the copy of the restored P-VOL to the external storage system, after the external storage system is detached from the first storage system 125, the external storage system can provide the host computer 101 with the P-VOL of at least one generation directly or via the third storage system 2201. This allows the external storage system to be used for an off-line backup or an archive.

Next, description will be made of the merge of the inter-generation differential data and the like.

Figure 23:
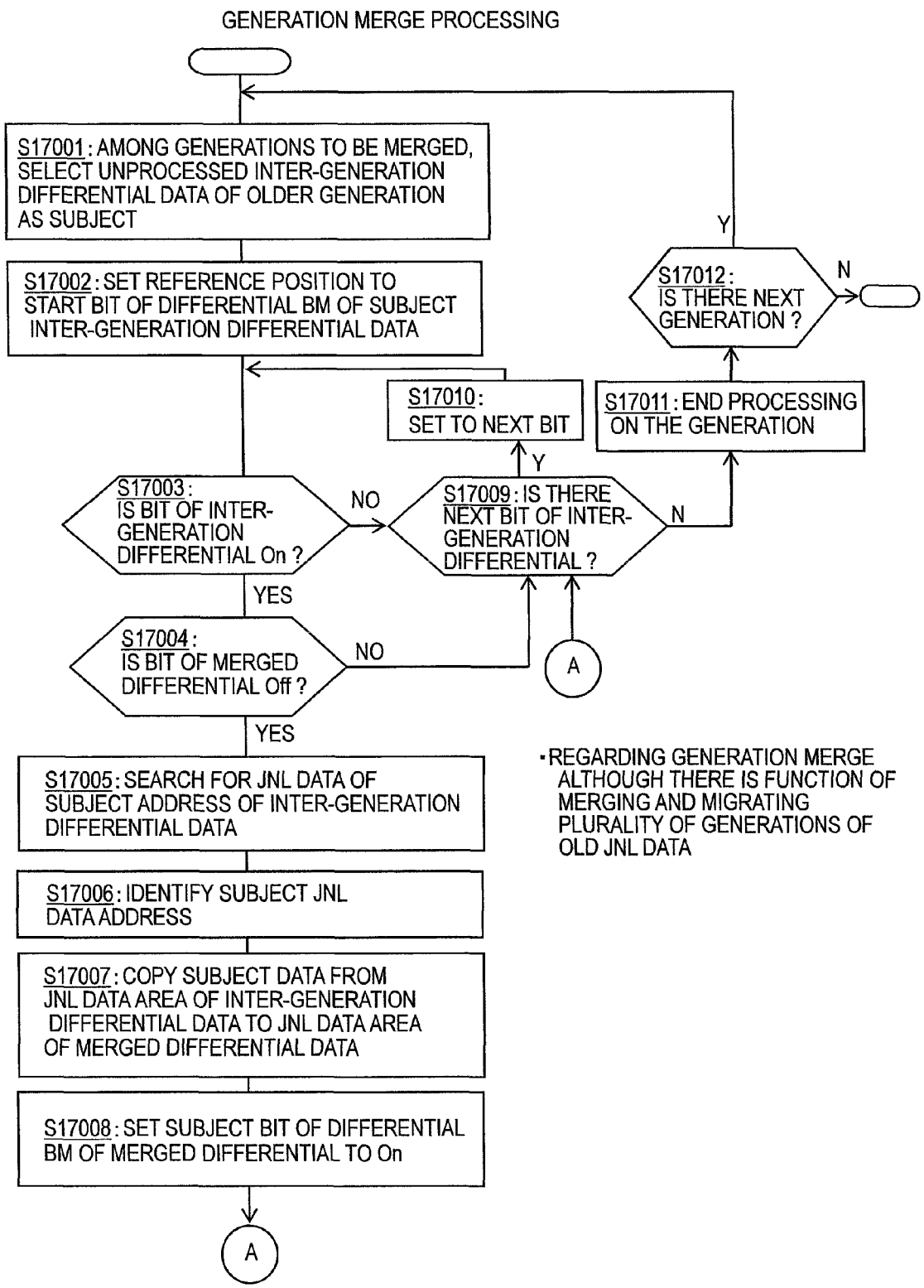
FIG. 23 is a flowchart illustrating a processing of merging inter-generation differential data, which is executed according to the first embodiment of this invention.
Figure 24:
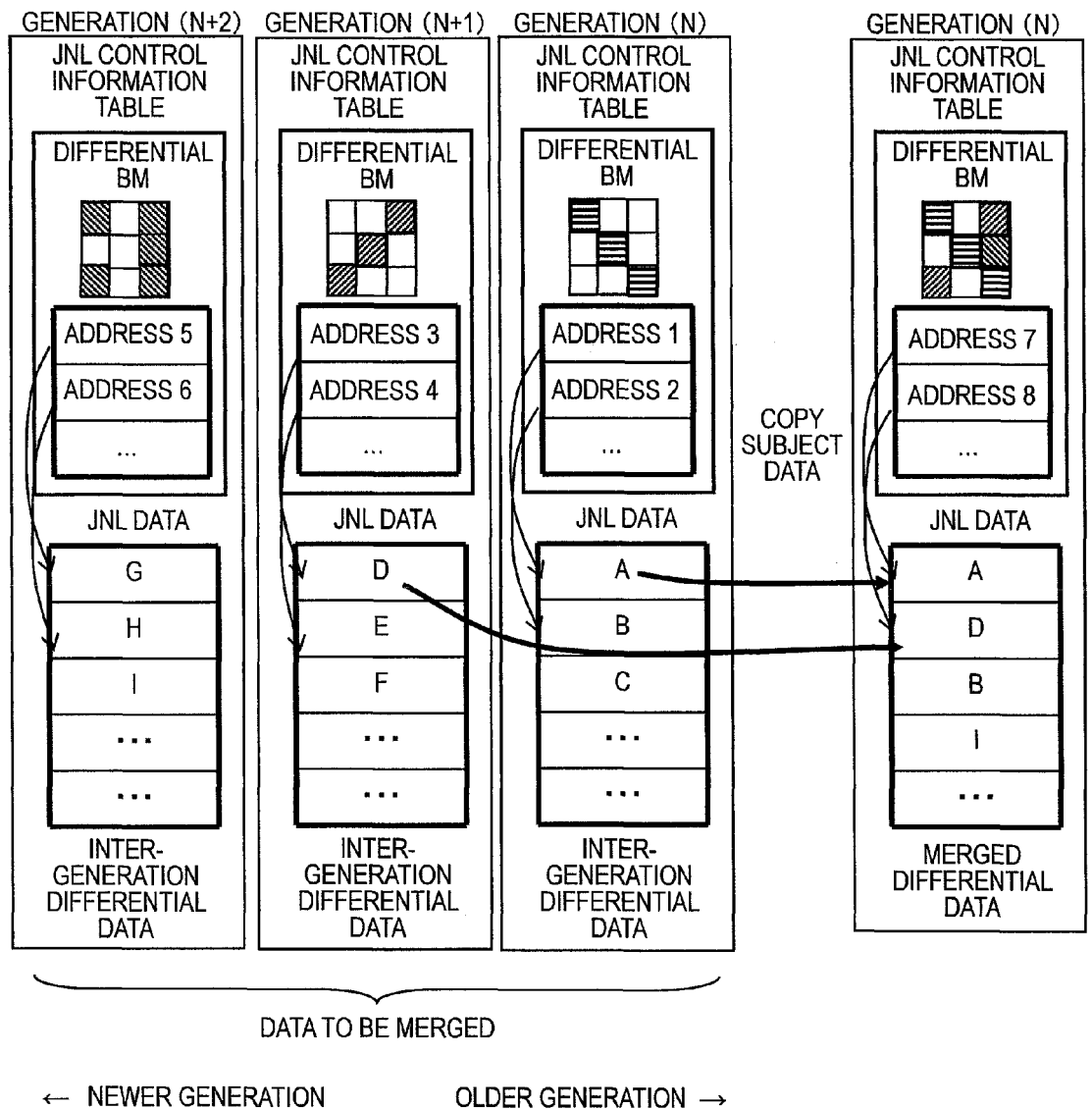
FIG. 24 is an explanatory diagram illustrating the movement of data elements involved in the merge processing executed according to the first embodiment of this invention.

As described by referring to FIGS. 23 and 24, in this embodiment, it is possible to merge the inter-generation differential data and the differential BM of a plurality of generations. This can reduce a consumed storage space. Hereinafter, the inter-generation differential data subjected to the merge will be referred to as "merged differential data".

FIG. 23 is a flowchart illustrating a processing of merging the inter-generation differential data, which is executed according to the first embodiment of this invention.

FIG. 24 is an explanatory diagram illustrating the movement of data elements involved in the merge processing executed according to the first embodiment of this invention.

By referring to FIGS. 23 and 24, the merge processing will be described hereinbelow.

As illustrated in FIG. 24, when the JNL merge program 208 illustrated in FIG. 2 detects that the inter-generation differential data corresponding to a given number of generations (for example, (m+1) generations, in other words, generations from generation (N) up to generation (N+m)) is stored, the JNL merge program 208 starts the merge processing of converting the inter-generation differential data corresponding to (m+1) generations into the merged differential data.

It should be noted that the start of the merge processing may be triggered by the detection of accumulation of the inter-generation differential data corresponding to the (m+1) generations as described above. However, the trigger is a mere example, and the merge processing may be started based on another trigger. For example, the start of the merge processing may be triggered by the elapse of a predetermined period since the previous merge processing.

The JNL merge program 208 updates a "status" (not shown) of the generations (N) through (N+m) to be merged within the JNL information table 231 to "merging". Then, the JNL merge program 208 selects, as a subject, the oldest generation (N) to be merged of the inter-generation differential data (S17001).

The JNL merge program 208 decides, as a reference position, the start bit of the differential BM (N) (in other words, (N)th generation differential BM 443) corresponding to the subject inter-generation differential data (S17002).

If the bit decided as the reference position regarding the differential BM (N) is on, the JNL merge program 208 executes Step S17004, and if the bit is off, executes Step S17009. Hereinafter, in the description with reference to FIGS. 23 and 24, the bit decided as the reference position will be referred to as "subject bit", and as "subject on-bit" if the bit is on, while as "subject off-bit" if it is off.

Regarding the differential BM (hereinafter, in the description with reference to FIGS. 23 and 24, referred to as "merged differential BM") corresponding to the merged differential data created at the current time, if the bit existing in the same position as the above-mentioned subject bit is off, the JNL merge program 208 executes Step S17005, and if the bit is on, executes Step S17009.

The JNL merge program 208 searches for the data storage address corresponding to the subject on-bit within the differential BM (N) (S17005), and identifies the address (S17006). Then, the JNL merge program 208 copies an inter-generation differential data element stored in a segment indicated by the address from the segment to a segment within a JNL sub-area which corresponds to the merged differential data created at the current time (in other words, next segment to copy-destination segment at previous time) (S17007). Then, the JNL merge program 208 turns on the bit existing in the same position as the above-mentioned subject bit within the merged differential BM (S17008).

The JNL merge program 208 judges whether or not there is an unreferenced bit in the next position to the already-referenced position within the differential BM (N) (S17009). If there is an unreferenced bit in the next position to the already-referenced position (in other words, if the judgment of Step S17009 results in "Y"), the JNL merge program 208 decides the next bit as a new reference position (S17010), and executes Step S17003.

On the other hand, if there is no such unreferenced bit in the next position to the already-referenced position (in other words, if the judgment of Step S17009 results in "N"), the processing on the generation (N) is brought to an end (S17011). Then, the JNL merge program 208 judges whether or not the next generation exists. If the next generation exists (in other words, if the judgment of Step S17012 results in "Y"), the JNL merge program 208 executes Step S17001 on the next generation (N+1). If the next generation does not exist (in other words, if the generation (N+m) was processed at the previous time ("N" in Step S17012)), the merge processing is brought to an end.

According to the above-mentioned flow, as illustrated in FIG. 24, the processing is performed starting from the inter-generation differential data corresponding to the oldest generation among the generations (N) through (N+m) to be merged. If a given bit within the differential BM corresponding to the inter-generation differential data is an on-bit, and if a bit corresponding to the on-bit is off within the merged differential BM, an inter-generation differential data element corresponding to the on-bit is copied to the JNL sub-area corresponding to the merged differential data. On the other hand, if a given bit within the differential BM corresponding to the inter-generation differential data is an on-bit, and if a bit corresponding to the on-bit is also on within the merged differential BM, a data element corresponding to the on-bit within the differential BM corresponding to the inter-generation differential data is not copied.

In short, the inter-generation differential data element corresponding to the older generation is copied more preferentially to the JNL sub-area corresponding to the merged differential data. Specifically, for example, with reference to FIG. 24, regarding the two generations (N) and (N+m) (if m=2, generation (N+2)), there exist the inter-generation differential data elements "A" and "G" corresponding to the start block of the P-VOL. In this case, the inter-generation differential data element corresponding to the older generation is more preferentially copied as described above, and hence the data element "A" regarding the generation (N) is copied as a JNL sub-entry corresponding to the merged differential data, while the data element "G" regarding the generation newer than the generation (N) is not copied as the JNL sub-entry.

It should be noted that, in the above-mentioned merge processing, the oldest generation is processed first, but the newest generation may be processed first. However, in this case, if a given bit within the differential BM corresponding to the inter-generation differential data is an on-bit, and if a bit corresponding to the on-bit is also on within the merged differential BM, a data element corresponding to the on-bit within the differential BM corresponding to the inter-generation differential data may be overwritten onto the merged differential data element corresponding to the on-bit, which is stored in the JNL sub-area corresponding to the merged differential data.

Further, in the case where the merged differential data is created, the inter-generation differential data corresponding to a plurality of generations based on which the merged differential data is created may be deleted immediately after the creation of the merged differential data has been completed, or in response to an instruction from a computer (for example, host computer 101 or management server 111).

Further, the inter-generation differential data or the merged differential data may be deleted from among the old generations. In this case, for example, a JNL deletion program (not shown) releases the JNL control information and the JNL data that correspond to a generation to be deleted, and manages the area, in which the JNL control information and the JNL data were stored, as a free space. In addition, the JNL deletion program deletes an entry corresponding to the generation to be deleted, from the JNL management table 224.

For example, the first storage system 125 may merge differentials stored in itself as described above, and then back up the merged differentials (in other words, merged journal data) to the second storage system 161.

Here, by referring to FIG. 21, description is made of a specific example of merging generations. For the brief description, the current time is a time point at which the generation N+2 is determined. In other words, the online P-VOL 187P at the current time point is the same as the P-VOL 187P of the determined generation N+2.

The processing of merging the generations N+1 and N+2 in this case will be described.

At a time point before the merge is executed, the JNL data elements 2702C and 2702E are retained as the differential data corresponding to the generation N+2. Those are the differential data elements that are necessary to restore the P-VOL 187P of the generation N+1 based on the P-VOL 187P of the generation N+2. In addition, the JNL data elements 2702A and 2702B are retained as the differential data corresponding to the generation N+1. Those are the differential data elements that are necessary to restore the P-VOL 187P of the generation N based on the P-VOL 187P of the generation N+1.

The processing of merging the generations N+1 and N+2 represents a processing of deleting the data other than the differential data elements that are necessary to restore the P-VOL 187P of the generation N based on the P-VOL 187P of the generation N+2 (in other words, differential data between P-VOL 187P of generation N+2 and P-VOL 187P of generation N).

In the example of FIG. 21, two differential data elements corresponding to the block in which the data element 2701G is stored, in other words, the JNL data elements 2702E and 2702A of the generation N+2 are retained. In this case, the JNL data element 2702A of the older generation is left, while the JNL data element 2702E is deleted. This is because the JNL data element 2702E is necessary to restore the P-VOL 187P of the generation N+1, but is not necessary to restore the P-VOL 187P of the generation N.

In the same manner, the JNL data elements 2702B and 2702C are left.

By merging the generations as described above, the JNL data element 2702E that is necessary only to restore the P-VOL 187P of the generation N+1 is deleted, and hence it becomes unable to restore the P-VOL 187P of the generation N+1 in exchange of an increase in free space of the storage area. In other words, by merging the generations, it is possible to delete the journal data necessary only to restore the generation that is less likely to need to be saved, which can reduce the space of the storage area for storing the journal data.

Next, by referring to FIGS. 25 through 27, description will be made of another example of migrating the journal data to the external storage system.

Figure 25:
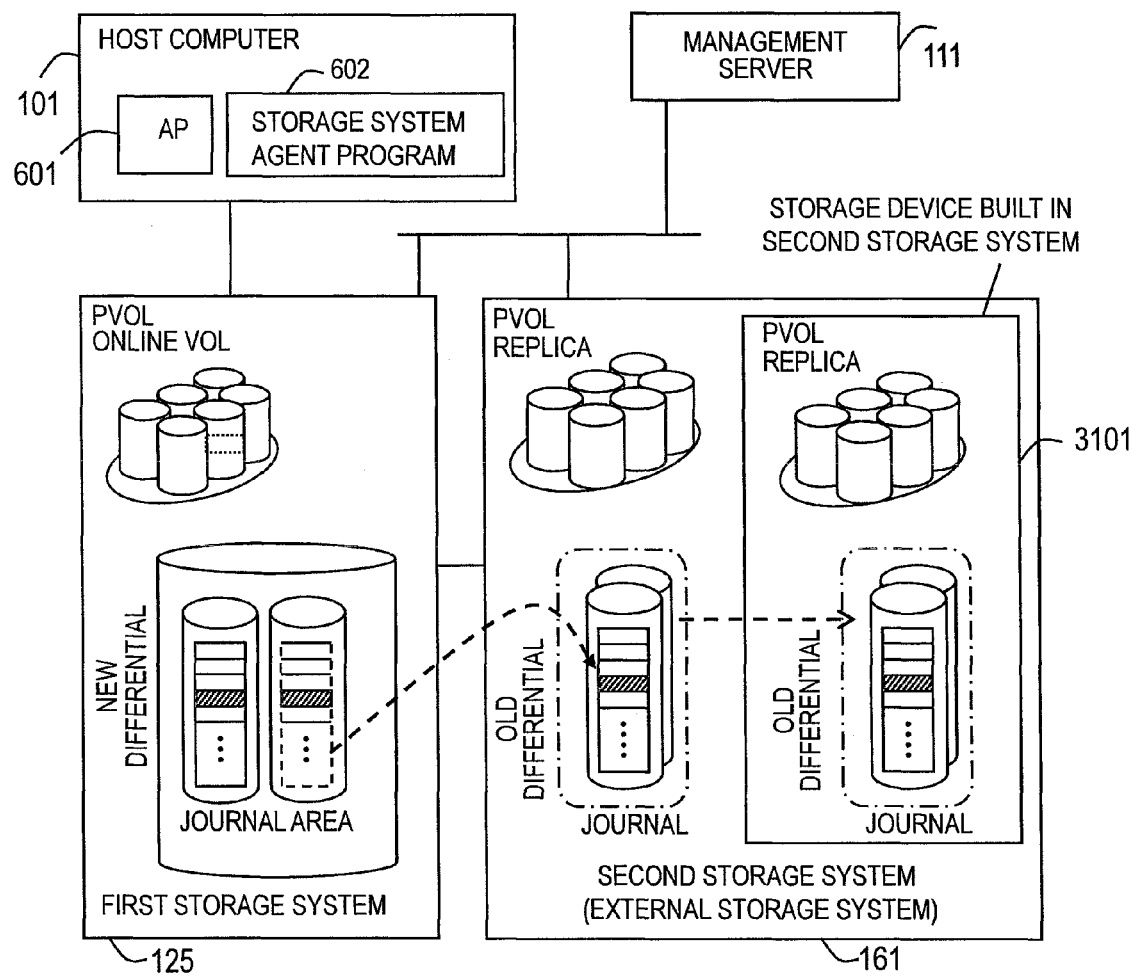
FIG. 25 is an explanatory diagram of the migration of the journal data in a case where the external storage system hierarchically manages the journal data, according to the first embodiment of this invention.

FIG. 25 is an explanatory diagram of the migration of the journal data in a case where the external storage system hierarchically manages the journal data, according to the first embodiment of this invention.

The second storage system 161 of this embodiment may include a different kind of storage medium than the first storage system 125. For example, the first storage system 125 includes at least one HDD, while the second storage system 161 may include a magnetic tape storage device (for example, tape library) 3101 in addition to the HDD. In this case, the second storage system 161 can hierarchically manage the journal data stored in the HDD and the journal data stored on the magnetic tape storage device 3101.

It should be noted that, in the example of FIG. 25, the magnetic tape storage device 3101 is merely an example, and the magnetic tape storage device 3101 may be replaced by another kind of storage device.

For example, as has already been described, in a case where the journal data having an access frequency lower than a predetermined value (first value) is migrated from the first storage system 125 to the second storage system 161, the journal data having an access frequency lower than a second value among the journal data migrated to the second storage system 161 is stored onto the magnetic tape storage device 3101, where the second value represents an access frequency lower than the first value.

In a case where the journal data of the older generation has a lower access frequency, the journal data of an older generation among the journal data stored in the first storage system 125 is migrated to the second storage system 161, and the journal data of an older generation among the journal data migrated to the second storage system 161 is stored onto the magnetic tape storage device 3101.

As described by referring to FIG. 11 and the like, the copy of the P-VOL may be stored into the second storage system 161. In that case, the copy of the P-VOL may be stored onto the magnetic tape storage device 3101 as well. Alternatively, the online P-VOL may be stored into the second storage system 161.

Figure 26:
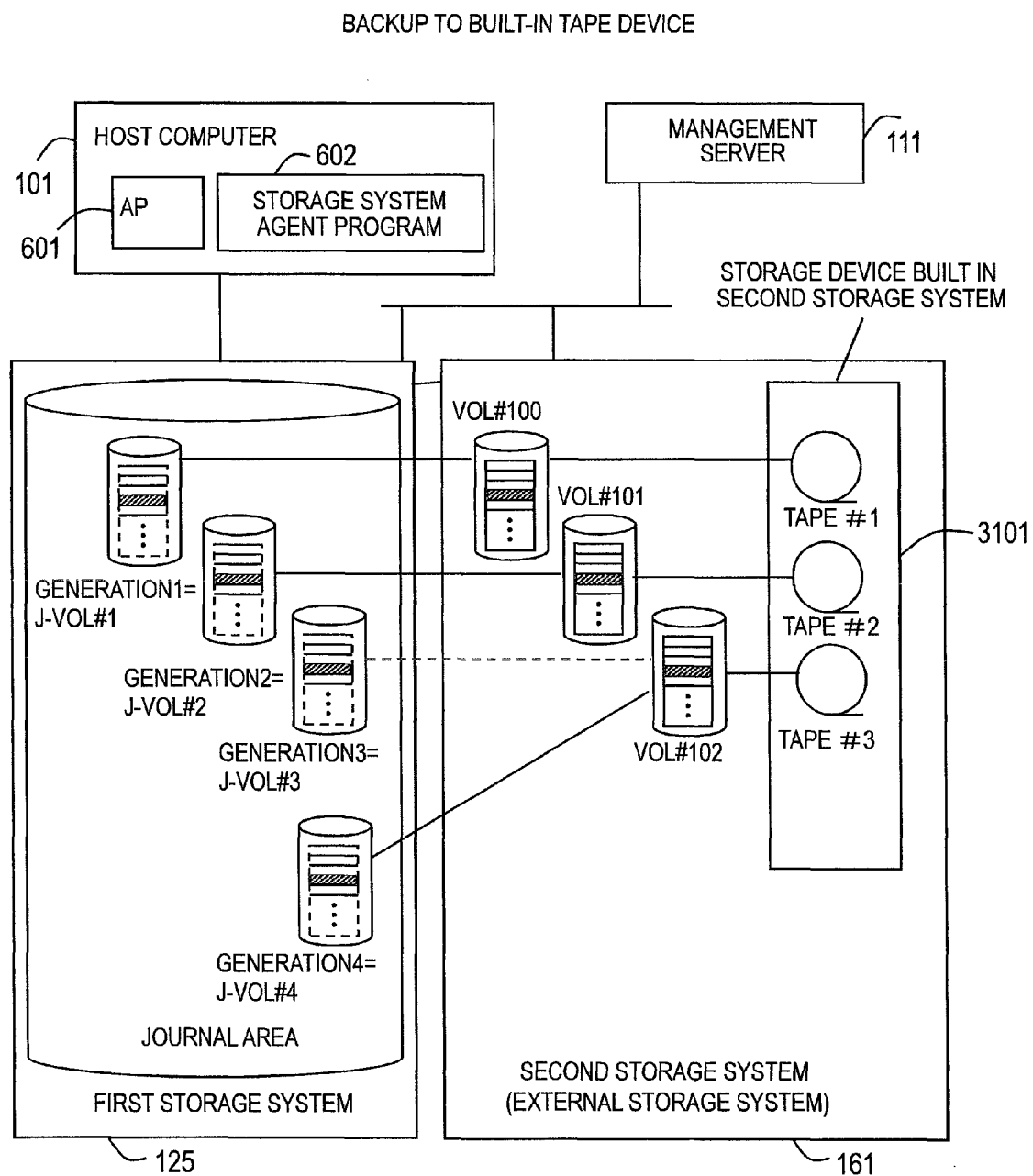
FIG. 26 is an explanatory diagram of the migration of the journal data in a case where the external storage system includes a magnetic tape storage device, according to the first embodiment of this invention.

FIG. 26 is an explanatory diagram of the migration of the journal data in a case where the external storage system includes a magnetic tape storage device, according to the first embodiment of this invention.

Specifically, FIG. 26 illustrates an example of storing the journal data onto a tape in a case where, in the example of FIG. 25, the storage device built in the second storage system 161 is the magnetic tape storage device 3101.

In the example of FIG. 26, the journal data of one generation is stored on one (in other words, one reel of) tape storage medium. Specifically, in the example of FIG. 26, in the JNL-related area 188 of the first storage system 125, the journal data items of four generations from the generations 1 through 4 are stored in four logical volumes identified by the identification numbers (identifiers) "1" through "4", respectively. In the following description, those four logical volumes will be referred to as "J-VOL#1" through "J-VOL#4", respectively.

The journal data stored in one logical volume within the JNL-related area 188 is migrated to one logical volume within the second storage system 161. Then, the journal data stored in the one logical volume within the second storage system 161 is stored onto one reel of tape storage medium.

In the example of FIG. 26, three logical volumes, in other words, three logical volumes identified by the identification numbers "100" through "102" are stored within the second storage system 161 as the migration destination of the journal data. In the following description, those three logical volumes will be referred to as "VOL#100" through "VOL#102", respectively. In addition, the magnetic tape storage device 3101 of FIG. 26 includes three tape storage media identified by the identification numbers "1" through "3", respectively. In the following description, those three tape storage media will be referred to as "tape #1" through "tape #3", respectively.

However, after the journal data stored in one logical volume within the JNL-related area 188 is migrated to one logical volume within the second storage system 161, the journal data stored in another logical volume within the JNL-related area 188 may be further migrated to the same logical volume within the second storage system 161.

In the example of FIG. 26, the journal data of the generation 1 is migrated from J-VOL#1 to VOL#100, and further stored into the tape #1. The journal data of the generation 2 is migrated from J-VOL#2 to VOL#101, and further stored into the tape #2. In the same manner, the journal data of the generation 3 is migrated from J-VOL#3 to VOL#102. However, after that, the journal data of the generation 4 is migrated from J-VOL#4 to VOL#102. At this time, the previously-migrated journal data of the generation 3 is deleted from VOL#102. Therefore, the journal data of the generation 4 is stored into the tape #3.

The management server 111 also manages information indicating which tape storage medium stores the journal data of which generation.

A storage area may be dynamically allocated to a logical volume within the second storage system 161. In other words, the physical storage area may be allocated only to the area of each logical volume in which data has been written. In this case, there may be a case where a capacity larger than a capacity of a physical storage area actually used by each logical volume is defined for each logical volume. Even in such a case, only the data actually stored in each logical volume is stored into the tape storage medium.

Figure 27:
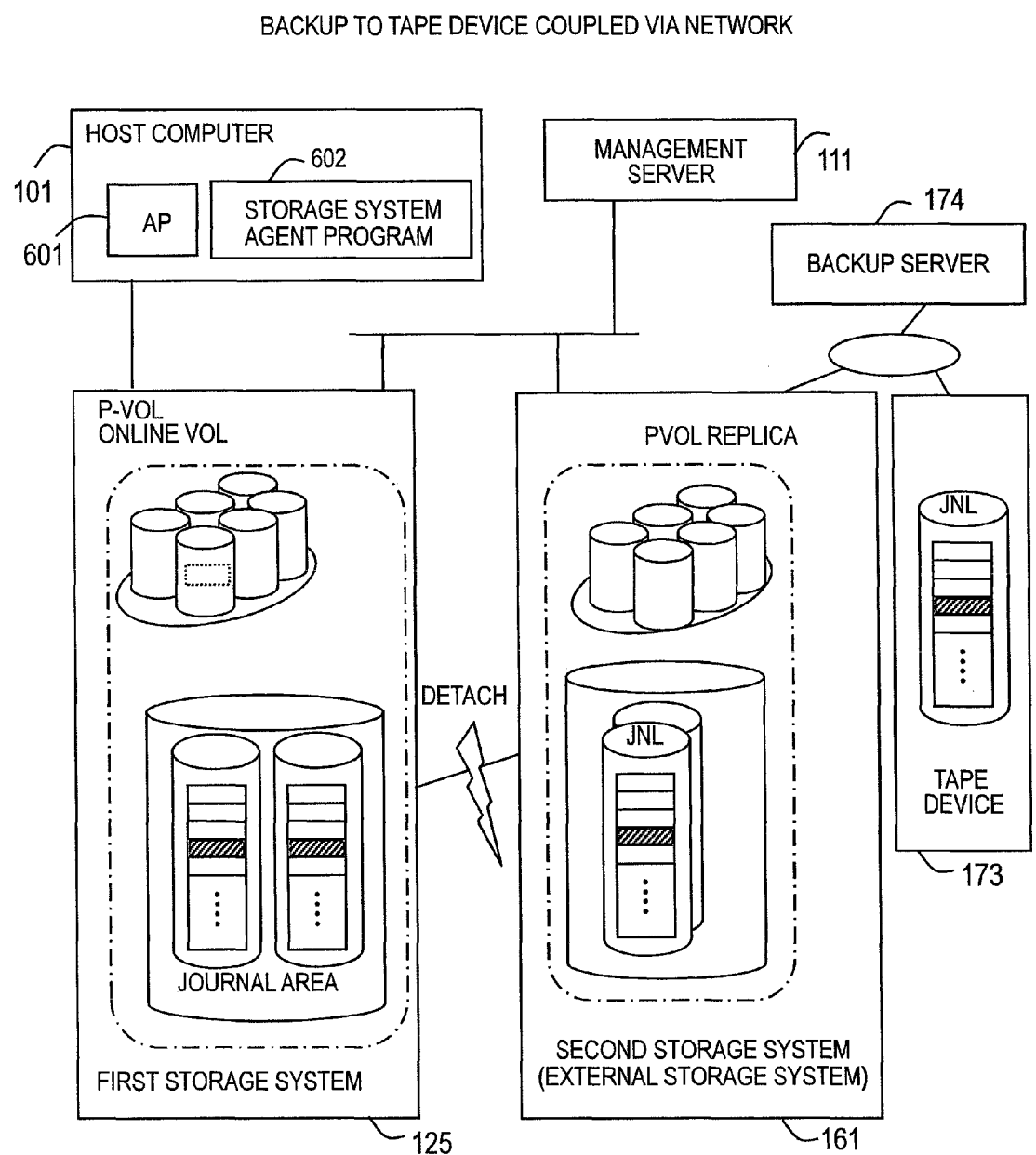
FIG. 27 is an explanatory diagram of the migration of the journal data in a case where the magnetic tape storage device is coupled to the external storage system, according to the first embodiment of this invention.

FIG. 27 is an explanatory diagram of the migration of the journal data in a case where the magnetic tape storage device is coupled to the external storage system, according to the first embodiment of this invention.

In FIG. 27, unlike the examples of FIGS. 25 and 26, a magnetic tape storage device 173 is coupled to the second storage system 161 via a network. Further coupled to the network is a backup server 174. The backup server 174 is a computer for controlling a backup performed on the data stored in the logical volume of the second storage system 161 with respect to the magnetic tape storage device 173.

For example, in the same manner as the case of FIG. 25, the journal data of an older generation among the journal data stored in the first storage system 125 is migrated to the second storage system 161, and the journal data of an older generation among the journal data migrated to the second storage system 161 may be further stored into the magnetic tape storage device 173.

Further stored into the second storage system 161 is the copy of the P-VOL necessary to restore the P-VOL by using the migrated journal data. If the second storage system 161 is detached from the first storage system 125, it is possible to restore the P-VOL by using the copy of the P-VOL stored in the second storage system 161, the journal data, and the journal data stored in the magnetic tape storage device 173.

The magnetic tape storage device 173 may store only the journal data, may store the copy of the P-VOL in addition to the journal data, or may store a logical volume of a given generation.

Next, description will be made of a second embodiment of this invention.

Figure 28:
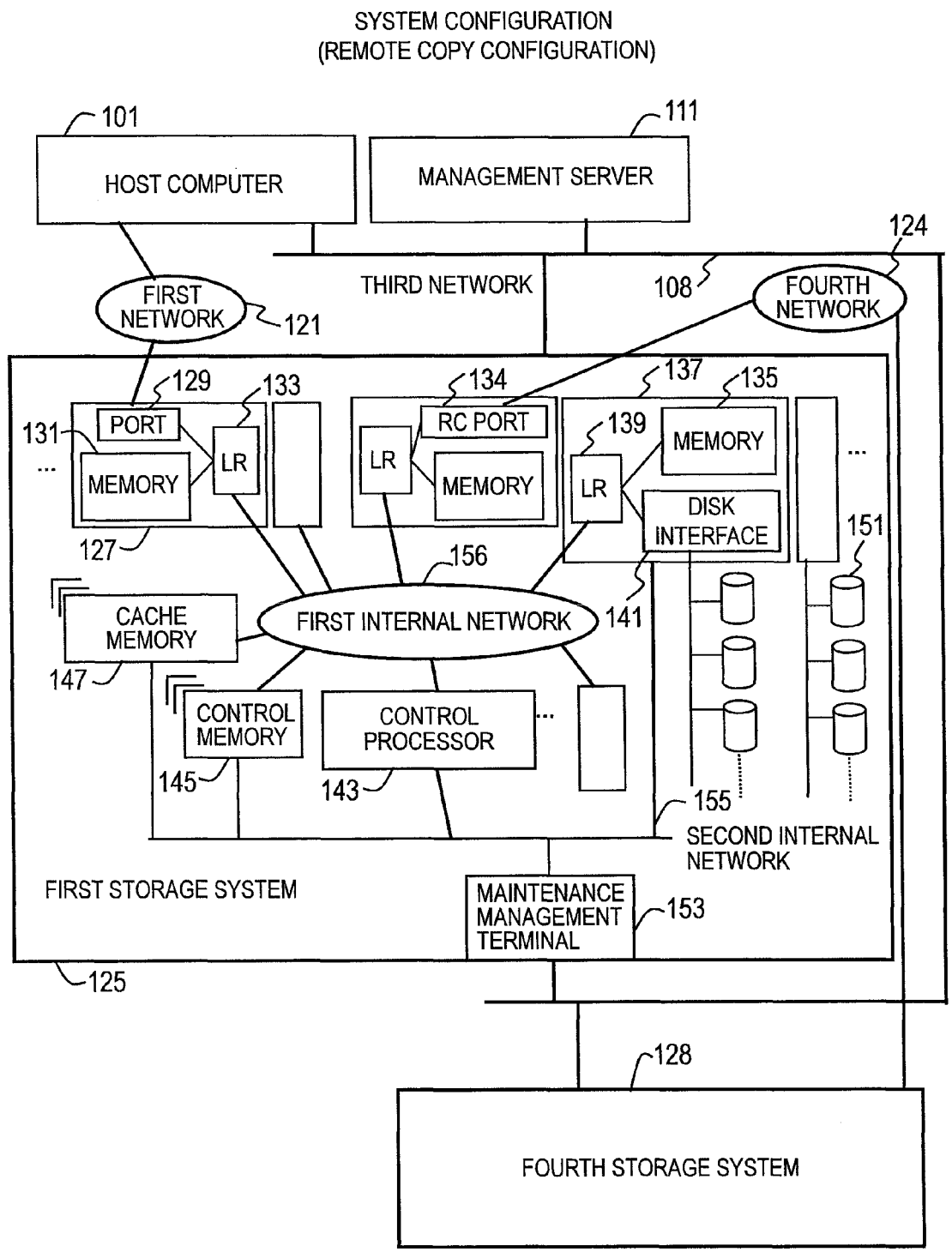
FIG. 28 is a block diagram illustrating a configuration of a computer system according to a second embodiment of this invention.

FIG. 28 is a block diagram illustrating a configuration of a computer system according to the second embodiment of this invention.

The computer system according to the second embodiment is the same as the computer system according to the first embodiment except that: the second storage system 161 is replaced by a fourth storage system 128; the first storage system 125 includes a remote copy (RC) port 134; and the first storage system 125 and the fourth storage system 128 are coupled to each other via a fourth network 124.

The fourth storage system 128 is, for example, a storage system having a configuration and a function that are equivalent to those of the first storage system 125. The RC port 134 of the first storage system 125 is coupled to an RC port (not shown) of the fourth storage system 128 via the fourth network 124.

The first storage system 125 and the fourth storage system 128 of this embodiment have a so-called remote copy function. In other words, it is possible to form a copy pair of a logical volume within the first storage system 125 and a logical volume within the fourth storage system 128. If data is written into the logical volume within the first storage system 125 belonging to the copy pair, the data is copied to the logical volume within the fourth storage system 128 belonging to the same copy pair. Accordingly, the same data is stored into two logical volumes that belong to one copy pair.

Also in the computer system including the storage system having such a remote copy function as described above, it is possible to execute the same migration and restoration of the journal data as in the first embodiment by handling the fourth storage system 128 as the external storage system according to the first embodiment.

Further, in a case where a remote copy is executed between the first storage system 125 and the fourth storage system 128, the fourth storage system 128 also retains the catalog management information table 311. Therefore, if the fourth storage system 128 is detached from the first storage system 125, it is possible to execute the detach processing illustrated in FIG. 14A. In this case, the second storage system 161 of FIG. 14A is replaced by the fourth storage system 128.

While the present invention has been described in detail and pictorially in the accompanying drawings, the present invention is not limited to such detail but covers various obvious modifications and equivalent arrangements, which fall within the purview of the appended claims.

What is claimed is:

1. A computer system, comprising:

a first storage system coupled to a network; and a second storage system coupled to the first storage system, the first storage system comprising:

a first physical storage device for storing data; and a first controller for controlling writing and reading of data to/from the first physical storage device, the first storage system managing a storage area of the first physical storage device within the first storage system as a plurality of logical volumes, the plurality of logical volumes within the first storage system including a first logical volume and a second logical volume, the second logical volume storing therein journal data related to the first logical volume, the journal data related to the first logical volume including a first differential data item representing a differential between data that was stored in the first logical volume at a first time instant and data that was stored in the first logical volume at a second time instant being later than the first time instant, the second storage system comprising:

a second physical storage device for storing data; and a second controller coupled to the first storage system, for controlling writing and reading of data to/from the second physical storage device, the second storage system managing a storage area of the second physical storage device within the second storage system as a plurality of logical volumes, the plurality of logical volumes within the second storage system including a third and fourth logical volume, wherein:

the first storage system being transfigured to transmit the copy of the journal data including the first differential data item and the data stored in the first volume at the second time instance to the second storage system;

the second storage system being transfigured to store the copy of the journal data received from the first storage system into the third logical volume;

the second storage system being transfigured to store the copy of data stored in the first volume received from the first storage system into the fourth logical volume, and to delete at least the first differential data item from the second logical volume; and wherein the journal data stored in the third logical volume includes the information managing the pair of the copy of the journal data stored in the third logical volume and the copy of data stored in the forth logical volume.

2. A computer system, comprising:

a first storage system coupled to a network; and a second storage system coupled to the first storage system, the first storage system comprising:

a first physical storage device for storing data; and a first controller for controlling writing and reading of data to/from the first physical storage device, the first storage system managing a storage area of the first physical storage device within the first storage system as a plurality of logical volumes, the plurality of logical volumes within the first storage system including a first logical volume and a second logical volume, the second logical volume storing therein journal data related to the first logical volume, the journal data related to the first logical volume including a first differential data item representing a differential between data that was stored in the first logical volume at a first time instant and data that was stored in the first logical volume at a second time instant being later than the first time instant, the second storage system comprising:

a second physical storage device for storing data; and a second controller coupled to the first storage system, for controlling writing and reading of data to/from the second physical storage device, the second storage system managing a storage area of the second physical storage device within the second storage system as a plurality of logical volumes, the plurality of logical volumes within the second storage system including a third and fourth logical volume, wherein:

at time of second time instant, the first storage system is configured to:

restore data that was stored in the first logical volume at the first time instant by reflecting the first differential data item to the data stored in the first logical volume at the time of second time instant, copy the journal data including the first differential data item and restored data that was stored in the first logical volume at the first time instant to the second storage system, and delete the journal data including first differential data item stored in the second logical volume and the restored data that was stored in the first logical volume at the first time instant from the first storage system.

3. The computer system according to the claim 2, wherein:

at the time of third time instant, the first storage system is configured to send the copy of the second differential data item representing a differential between data that was stored in the first logical volume at a second time instant and data that was stored in the first logical volume at a third time instant being later than the second time instant to the second storage system.

4. A computer system, comprising:

a first storage system coupled to a network; and a second storage system coupled to the first storage system, the first storage system comprising:

a first physical storage device for storing data; and a first controller for controlling writing and reading of data to/from the first physical storage device, the first storage system managing a storage area of the first physical storage device within the first storage system as a plurality of logical volumes, wherein at least a first logical volume of the plurality of logical volumes stores data and at least more than two second logical volumes of the plurality of logical volumes store journal data of a different generation related to the data in the first logical volume, each of the journal data stored in the more than two logical volumes including a differential data item representing a differential between data that was stored in the first logical volume at a certain time instant and data that was stored in the first logical volume at a another certain time instant being later than the certain time instant, the second storage system comprising:

a plurality of tape storage devices; and a second controller coupled to the first storage system, for controlling writing and reading of data to/from the tape storage devices, the second storage system managing a storage area of the tape storage devices within the second storage system as a plurality of logical volumes, wherein:
the first storage system being transfigured to transmit the copy of the plurality of journal data including the differential data to the second storage system;
the second storage system being transfigured to store each of the copy of the journal data received from the first storage system into the each of the logical volumes of the second storage system and transfers each of the copy of the journal data stored in the logical volumes to the second storage system to each of the plurality of tape storage devices,
wherein the journal data stored in the second storage system includes the information managing the relation between the journal data and the data related to the journal data which is stored in the first storage system.

5. A method of controlling a computer system,
the computer system comprising:
a first storage system coupled to a network; and
a second storage system coupled to the first storage system,
the first storage system comprising:
a first physical storage device for storing data; and
a first controller for controlling writing and reading of data to/from the first physical storage device,
the first storage system managing a storage area of the first physical storage device within the first storage system as a plurality of logical volumes,
the plurality of logical volumes within the first storage system including a first logical volume and a second logical volume,
the second logical volume storing therein journal data related to the first logical volume,
the journal data related to the first logical volume including a first differential data item representing a differential between data that was stored in the first logical volume at a first time instant and data that was stored in the first logical volume at a second time instant being later than the first time instant,
the second storage system comprising:
a second physical storage device for storing data; and
a second controller coupled to the first storage system, for controlling writing and reading of data to/from the second physical storage device,
the second storage system managing a storage area of the second physical storage device within the second storage system as a plurality of logical volumes,
the plurality of logical volumes within the second storage system including a third and fourth logical volume,
the method comprising:
transmitting, by the first storage system, the copy of the journal data including the first differential data item and the data stored in the first volume at the second time instance to the second storage system;
storing, by the second storage system, the copy of the journal data received from the first storage system into the third logical volume;
storing, by the second storage system, the copy of data stored in the first volume received from the first storage system into the fourth logical volume, and
deleting at least the first differential data item from the second logical volume;
wherein the journal data stored in the third logical volume includes the information managing the pair of the copy of the journal data stored in the third logical volume and the copy of data stored in the fourth logical volume.

6. A method of controlling a computer system,
the computer system comprising:
a first storage system coupled to a network; and
a second storage system coupled to the first storage system,
the first storage system comprising:
a first physical storage device for storing data; and
a first controller for controlling writing and reading of data to/from the first physical storage device,
the first storage system managing a storage area of the first physical storage device within the first storage system as a plurality of logical volumes,
the plurality of logical volumes within the first storage system including a first logical volume and a second logical volume,
the second logical volume storing therein journal data related to the first logical volume,
the journal data related to the first logical volume including a first differential data item representing a differential between data that was stored in the first logical volume at a first time instant and data that was stored in the first logical volume at a second time instant being later than the first time instant,
the second storage system comprising:
a second physical storage device for storing data; and
a second controller coupled to the first storage system, for controlling writing and reading of data to/from the second physical storage device,
the second storage system managing a storage area of the second physical storage device within the second storage system as a plurality of logical volumes,
the plurality of logical volumes within the second storage system including a third and fourth logical volume,
the method comprising:
at a time of the second time instant, the first storage system:
restoring, by the first storage system, at the time of the second time instant, data that was stored in the first logical volume at the first time instant by reflecting the first differential data item to the data stored in the first logical volume at the time of the second time instant,
copying, by the first storage system, the journal data including the first differential data item and restored data that was stored in the first logical volume at the first time instant to the second storage system,
deleting, by the first storage system, the journal data including the first differential data item stored in the second logical volume and the restored data that was stored in the first logical volume at the first time instant from the first storage system.

7. The computer system according to the claim 2,
the method further comprising:
sending, by the first storage system, at the time of the third time instant, the copy of the second differential data item representing a differential between data that was stored in the first logical volume at a second time instant and data that was stored in the first logical volume at a third time instant being later than the second time instant to the second storage system.

* * * * *